(12) United States Patent
Kuraoka et al.

(10) Patent No.: US 8,367,192 B2
(45) Date of Patent: Feb. 5, 2013

(54) INTERMEDIATE TRANSFER BELT

(75) Inventors: Takashi Kuraoka, Moriyama (JP);
Satoshi Mitsui, Moriyama (JP); Yuukii Matsumura, Konan (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 13/388,784

(22) PCT Filed: Aug. 4, 2010

(86) PCT No.: PCT/JP2010/063226
§ 371 (c)(1), (2), (4) Date: Feb. 3, 2012

(87) PCT Pub. No.: WO2011/016500
PCT Pub. Date: Feb. 10, 2011

(65) Prior Publication Data
US 2012/0128953 A1 May 24, 2012

(30) Foreign Application Priority Data

Aug. 4, 2009 (JP) .................................. 2009-181827
Sep. 17, 2009 (JP) .................................. 2009-216270

(51) Int. Cl.
*B32B 25/08* (2006.01)
*B32B 38/18* (2006.01)
(52) U.S. Cl. .................................. 428/215; 156/244.24
(58) Field of Classification Search .................. 428/215; 156/244.24
See application file for complete search history.

(56) References Cited

U.S. PATENT DOCUMENTS 6,044,243 A 3/2000 Hara
2009/0074479 A1 3/2009 Kamijo et al.

FOREIGN PATENT DOCUMENTS

| JP | 2000-330390 | | 11/2000 |
| JP | 3248455 | | 11/2001 |
| JP | 2009-25421 | | 2/2009 |
| JP | 2009025421 A | * | 2/2009 |
| JP | 2009-86633 | | 4/2009 |

OTHER PUBLICATIONS

Machine_English_Translation_JP_2009025421_A1; Multilayer Elastic Belt used for Image Forming Device; Feb. 5, 2009; JPO; whole document.*

International Search Report issued Aug. 31, 2010 in International (PCT) Application No. PCT/JP2010/063226.

* cited by examiner

*Primary Examiner* — David Sample
*Assistant Examiner* — Tahseen N Khan
(74) *Attorney, Agent, or Firm* — Wenderoth, Lind & Ponack, L.L.P.

(57) ABSTRACT

A main object of the present invention is to provide an intermediate transfer belt for image-forming devices and a method for producing the intermediate transfer belt, the intermediate transfer belt having excellent image transfer to rough paper and resistance to abrasion and being free from problems such as filming, by forming a surface layer that has excellent resistance to abrasion and in which defects such as pinholes are not likely to occur even when the surface layer is thinned.

8 Claims, 3 Drawing Sheets

INTERMEDIATE TRANSFER BELT

TECHNICAL FIELD

The present invention relates to an intermediate transfer belt for image-forming devices such as copying machines, printers, and facsimiles.

BACKGROUND ART

To improve the quality of images obtained by image-forming devices, two-layer or three-layer intermediate transfer belts including a rubber-elastic layer formed of a rubber-elastic resin, etc., have been suggested (for example, see Patent Literature 1).

Since such an intermediate transfer belt having a rubber-elastic layer has excellent flexibility, a stable transfer image area can be formed on the intermediate transfer belt by the uniform contact between the belt and a photo conductor, etc., and stress applied to toner between the belt and the photo conductor, etc., can be reduced. Therefore, by using an intermediate transfer belt including a rubber-elastic layer, missing defects on line image can be prevented, and fine line printing definition can be improved. Further, it is also known that when paper having a rough surface (rough paper) is used, the tracking ability over uneven paper is improved, which prevents a reduction in image quality.

In such a high-quality image-forming intermediate transfer belt, a rubber-elastic property is provided in the belt thickness direction, and the toner releasability that is necessary for the transfer belt is required as an important factor. Namely, to transfer toner from the surface of the intermediate transfer belt to a medium such as paper, toner releasability is required. Therefore, it is not desirable for a rubber-elastic layer having toner adhesiveness to be exposed to the surface of the intermediate transfer belt; accordingly, a resin surface layer having a low friction coefficient and excellent toner releasability is generally formed on the rubber-elastic layer (see, for example, FIG. 1). It is known that making such a surface layer as thin as possible is useful for obtaining high image quality, and various intermediate transfer belts having a thin surface layer have been suggested.

However, since the intermediate transfer belt for an image-forming device receives external force from paper and a sliding member such as a cleaning blade, roller, that is in contact with a belt surface when the surface layer has a thin film, stress applied to the belt is concentrated on the thin film surface layer, which causes problems such as cracking or peeling of the surface layer. Moreover, even when the hardness of the entire belt is increased to overcome such a problem, although excellent durability can be attained, there is a problem of reducing the image quality.

Thus, it is extremely difficult for an intermediate transfer belt having a thin surface layer to attain high external friction resistance, etc., while maintaining high image quality.

CITATION LIST

Patent Literature

PTL 1: U.S. Pat. No. 3,248,455

SUMMARY OF INVENTION

Technical Problem

A primary object of the present invention is to provide an intermediate transfer belt for image-forming devices having high external friction resistance, etc., while maintaining high image quality.

Solution to Problem

The present inventors found the following: an intermediate transfer belt for an image-forming device comprising a base layer, a rubber-elastic layer, and a surface layer, wherein a specific amount of a filler is added to the rubber-elastic layer, the filler is locally distributed in the surface layer side of the rubber-elastic layer, and/or the dynamic ultramicro hardness measured from the surface layer side is 2.5 to 4.5 N/mm² at an indentation depth of 2 μm, and 1.0 N/mm² or less at an indentation depth of 10 μm can exhibit high external friction resistance, etc., while maintaining high image quality. In addition, in the intermediate transfer belt of the present invention, since the thickness of the surface layer can be reduced, the tracking ability over uneven paper can be further improved. The present invention is accomplished as a result of further studies based on these findings.

The present invention provides the following intermediate transfer belt for image-forming devices.

Item 1. An intermediate transfer belt for an image-forming device, comprising at least the following three layers laminated in the described order:
  (a) a base layer formed from resin,
  (b) a rubber-elastic layer formed from a rubber or elastomer, having a thickness of 200 to 400 μm, and
  (c) a surface layer formed from resin, having a thickness of 0.5 to 6 μm,
wherein the intermediate transfer belt has the following properties:
  (i) the dynamic ultramicro hardness (ISO14577-1) measured from the surface layer side is 2.5 to 4.5 N/mm² at an indentation depth of 2 μm, and 1.0 N/mm² or less at an indentation depth of 10 μm, and/or
  (ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 μm, to the mass concentration $M_3$ of the filler in the region from 120 μm to 140 μm in depth from the interface between the surface layer and the rubber-elastic layer toward the base layer is 1.3 or higher.

Item 2. The intermediate transfer belt for an image-forming device according to Item 1, wherein (i) the dynamic ultramicro hardness (ISO14577-1) measured from the surface layer side is 2.5 to 4.5 N/mm² at an indentation depth of 2 μm, and 1.0 N/mm² or less at an indentation depth of 10 μm.

Item 3. The intermediate transfer belt for an image-forming device according to Item 2, wherein further (ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 μm, to the mass concentration $M_3$ of the filler in the region from 120 μm to 140 μm in depth from the interface between the surface layer and the rubber-elastic layer toward the base layer is 1.3 or higher.

Item 4. The intermediate transfer belt for an image-forming device according to Item 1, wherein (ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 μm, to the mass concentration $M_3$ of the filler in the region from 120 μm to 140 μm in depth from the interface between the surface layer and the rubber-elastic layer toward the base layer is 1.3 or higher.

Item 5. The intermediate transfer belt for an image-forming device according to any of Items 1 to 4, wherein the rubber-elastic layer comprises two or more layers having different degrees of hardness, and the type A hardness of the rubber layer on the surface layer side is higher than the type A hardness of the rubber layer on the base layer side.

Item 6. The intermediate transfer belt for an image-forming device according to any of Items 1 to 5, wherein the Young's modulus of the surface layer is 300 to 2,000 MPa.

Item 7. The intermediate transfer belt for an image-forming device according to any of Items 1 to 6, wherein the IRHD value (JIS K6253) measured from the surface layer side is 82 or less.

Item 8. A method for producing an intermediate transfer belt for an image-forming device, comprising the steps of
(1) subjecting resin to centrifugal molding or melt extruding to form a base layer;
(2) dissolving or swelling resin in an organic solvent to prepare a solution, and subjecting the solution to centrifugal molding using a cylindrical mold to form a surface layer having a thickness of 0.5 to 6 μm;
(3) forming a rubber-elastic layer having a thickness of 200 to 400 μm on the inner surface of the surface layer obtained in (2) by subjecting a material for the rubber-elastic layer containing a filler (a composition for forming an elastic layer) to centrifugal molding on the inner surface to form a two-layered film; and
(4) placing the outer surface of the base layer obtained in (1) onto the inner surface of the rubber-elastic layer of the two layered film obtained in (3), and performing a heat treatment.

Advantageous Effects of Invention

In the intermediate transfer belt for an image-forming device of the present invention, by increasing the rubber hardness of the rubber-elastic layer only in the portion that is in contact with the surface layer, the concentration of stress on the surface layer can be prevented, and excellent durability can be attained while maintaining high image quality.

Thus, because of the excellent durability and high image quality, the intermediate transfer belt for an image-forming device of the present invention can be suitably used as an intermediate transfer belt for image-forming devices employing an electrophotographic system such as copying machines (including color copying machines), printers, facsimiles, etc.

REFERENCE SYMBOL LIST

Figure 3:
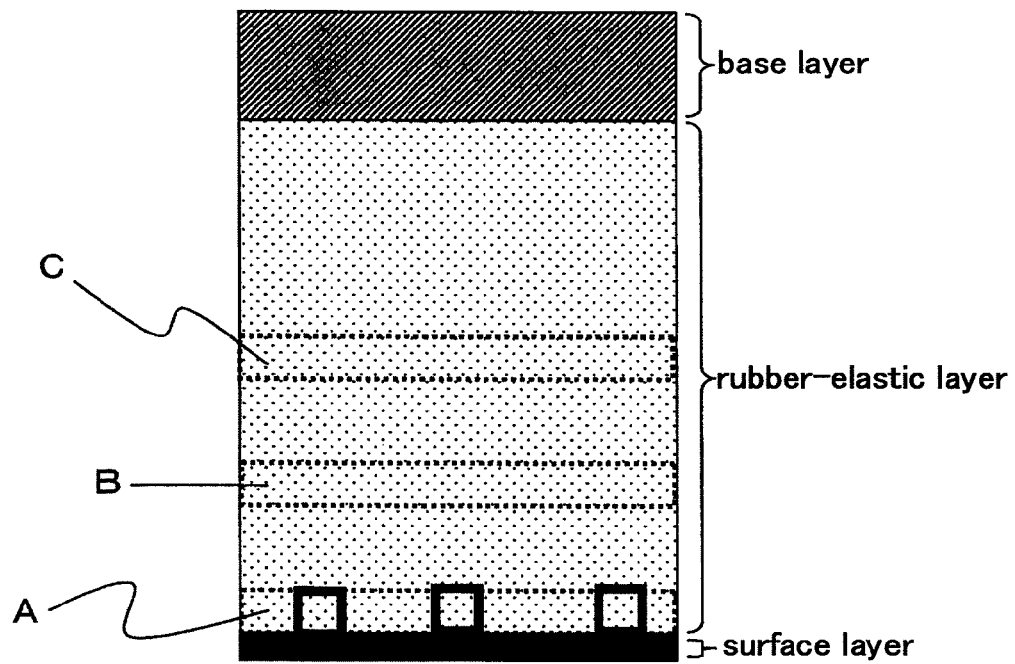
FIG. 3 is a cross sectional view of the belt.

A: The region from the interface between the surface layer and the rubber-elastic layer toward the base layer to a depth of 20 μm (FIG. 3).
B: The region from 60 μm to 80 μm in depth from the interface between the surface layer and the rubber-elastic layer toward the base layer (FIG. 3).
C: the region from 120 μm to 140 μm in depth from the interface between the surface layer and the rubber-elastic layer toward the base layer (FIG. 3).

DESCRIPTION OF EMBODIMENTS

1. Intermediate Transfer Belt for Image-forming Devices (hereinbelow also referred to as an intermediate transfer belt)

The intermediate transfer belt for an image-forming device of the present invention relates to an intermediate transfer belt for an image-forming device comprising at least the following three layers laminated in the described order: (a) a base layer formed from resin, (b) a rubber-elastic layer formed from a rubber or elastomer, having a thickness of 200 to 400 μm, and (c) a surface layer formed from resin, having a thickness of 0.5 to 6 μm, wherein the intermediate transfer belt has the following properties
(i) the dynamic ultramicro hardness (ISO14577-1) measured from the surface layer side is 2.5 to 4.5 N/mm² at an indentation depth of 2 μm, and 1.0 N/mm² or less at an indentation depth of 10 μm, and/or
(ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 μm, to the mass concentration $M_3$ of the filler in the region from 120 μm to 140 μm in depth from the interface between the surface layer and the rubber-elastic layer toward the base layer is 1.3 or higher.

In the aforementioned intermediate transfer belts, a belt having feature (ii) is referred to as an "intermediate transfer belt 1," a belt having feature (i) is referred to as an "intermediate transfer belt 2," and a belt having both features (i) and (ii) is referred to as an "intermediate transfer belt 3."

In the intermediate transfer belts 1, 2, and 3, the rubber hardness of the rubber-elastic layer is increased only in the portion that is in contact with the surface layer; consequently, the concentration of stress on the surface layer can be prevented, and excellent durability can be attained while maintaining high image quality.

Hereinafter, each of the intermediate transfer belts 1, 2, and 3 is explained in detail.

1.1 Intermediate Transfer Belt 1

The intermediate transfer belt of the present invention is an intermediate transfer belt for an image-forming device comprising at least the following three layers laminated in the described order: (a) a base layer formed from resin, (b) a rubber-elastic layer formed from a rubber or elastomer, having a thickness of 200 to 400 μm, and (c) a surface layer formed from resin, having a thickness of 0.5 to 6 μm, wherein (ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 μm, to the mass concentration $M_3$ of the filler in the region from 120 μm to 140 μm in depth from the interface between the surface layer and the rubber-elastic layer toward the base layer is 1.3 or higher.

(a) Base Layer

To prevent the deformation of the belt caused by stress applied when driven, the base layer of the intermediate transfer belt 1 of the present invention comprises material having an excellent mechanical property. The base layer is a layer in which a conductive agent is dispersed in a resin. The base layer comprises a composition for forming the base layer, which contains a resin and a conductive agent.

Examples of the resin include polyimide, polyamideimide, polycarbonate, poly vinylidene fluoride (PVdF), ethylenetetrafluoroethylene copolymer, polyimide, polyphenylene sulfide, mixtures thereof, and the like.

The polyimide is generally obtained by condensation polymerization of tetracarboxylic dianhydride with diamine or diisocyanate as monomer components according to a known method. Generally, tetracarboxylic dianhydride and diamine are reacted in a solvent such as N-methyl-2-pyrrolidone (hereinbelow referred to as NMP) to form a polyamic acid solution, and a conductive agent detailed below is dispersed in the polyamic acid solution to form a composition for forming the base layer.

Examples of the solvent used in this reaction include aprotic organic polar solvents such as NMP, N,N-dimethylformamide, N,N-diethylformamide, N,N-dimethylacetamide, dimethylsulfoxide, hexamethylphosphoramide, and 1,3-dimethyl-2-imidazolidinone. These solvents can be used singly or as a mixture of two or more. Of these, NMP is preferable.

Examples of the tetracarboxylic dianhydride include dianhydrides such as pyromellitic acid, naphthalene-1,4,5,8-tetracarboxylic acid, naphthalene-2,3,6,7-tetracarboxylic acid, 2,3,5,6-biphenyl tetracarboxylic acid, 2,2',3,3'-biphenyl tetracarboxylic acid, 3,3',4,4'-biphenyl tetracarboxylic acid, 3,3',4,4'-diphenyl ether tetracarboxylic acid, 3,3',4,4'-benzophenone tetracarboxylic acid, 3,3',4,4'-diphenylsulfone tetracarboxylic acid, azobenzene-3,3',4,4'-tetracarboxylic acid, bis(2,3-dicarboxyphenyl)methane, bis(3,4-dicarboxyphenyl)methane, β,β-bis(3,4-dicarboxyphenyl)propane, and β,β-bis(3,4-dicarboxyphenyl)hexafluoropropane.

Examples of the diamine include m-phenylenediamine, p-phenylenediamine, 2,4-diaminotoluene, 2,6-diaminotoluene, 2,4-diaminochlorobenzene, m-xylylenediamine, p-xylylenediamine, 1,4-diaminonaphthalene, 1,5-diaminonaphthalene, 2,6-diaminonaphthalene, 2,4'-diaminobiphenyl, benzidine, 3,3'-dimethylbenzidine, 3,3'-dimethoxybenzidine, 3,4'-diamino diphenyl ether, 4,4'-diamino diphenyl ether (ODA), 4,4'-diamino diphenyl sulfide, 3,3'-diaminobenzophenone, 4,4'-diaminodiphenyl sulfone, 4,4'-diaminoazobenzene, 4,4'-diaminodiphenylmethane, β,β-bis(4-aminophenyl)propane, and the like.

Examples of the diisocyanate include compounds in which an amino group in the diamine component is substituted with an isocyanate group.

The polyamideimide is obtained by condensation polymerization of trimellitic acid and diamine or diisocyanate according to a known method. In this case, the same diamine or diisocyanate used as a material for the polyimide can be used. As a solvent used in the condensation polymerization, those used in the polyimide can be used.

Examples of the conductive agent dispersed in the base layer include conductive carbon-based materials such as carbon black and graphite, metals or alloys such as aluminum and copper alloy, conductive metallic oxides such as tin oxide, zinc oxide, antimony oxide, indium oxide, potassium titanate, antimony tin oxide (ATO) and indium tin oxide (ITO), and the like. These fine powders can be used singly or as a mixture of two or more. As a conductive agent added to the base layer, a conductive carbon-based material is preferable, and carbon black is more preferable.

The proportion of the conductive agent in the base layer may be generally about 5 to 30 wt % (about 5 to 30 wt % of the solids content of the composition for forming the base layer). This imparts conductivity suitable for the intermediate transfer belt to the base layer.

The solids content of the composition for forming the base layer is preferably 10 to 40 wt %.

Although the method for preparing the composition for forming the base layer is not particularly limited, it is preferable to mix materials using a ball mill, etc., after the addition of the materials, to form a solution composition in which a conductive agent such as carbon black is uniformly dispersed.

In consideration of flexibility and stress applied to the belt when driven, the thickness of the base layer is generally 30 to 120 μm, and preferably 50 to 100 μm.

(b) Rubber-Elastic Layer

The elastic layer in the intermediate transfer belt 1 of the present invention is mainly provided in order to improve the tracking ability over uneven paper and to prevent missing defects on line image caused by stress concentration on the toner during transfer. The rubber-elastic layer is formed from a composition for forming an elastic layer comprising a rubber or elastomer (hereinafter sometimes referred to as rubber material).

Although the rubber material for forming the rubber-elastic layer is not particularly limited, examples thereof include isoprene rubber, butadiene rubber, chloroprene rubber, styrene butadiene rubber (SBR), acrylonitrile butadiene rubber (NBR), silicone rubber, fluoro rubber, butyl rubber (IIR), acrylic rubber (ACM), urethane rubber, and the like. Of these, silicone rubber, fluoro rubber, butyl rubber, acrylic rubber, and urethane rubber are preferable.

As silicone rubber, liquid silicone rubber can be used. Specifically, KE-106, KE1300, etc., produced by Shin-Etsu Chemical Co., Ltd. can be used.

Examples of the fluoro rubber include vinylidene fluoride fluoro rubber (FKM), tetrafluoroethylene propylene fluoro rubber (FEPM), tetrafluoroethylene perfluoro (vinyl ether) fluoro rubber (FFKM), and the like. Specifically, fluoro rubber coating material GLS-213F, GLS-223F, etc., produced by Daikin Industries, Ltd., and fluoro rubber coating material FFX-401161 produced by Taihei Kasei Kogyo, Co., Ltd., can be used.

Examples of the butyl rubber include isobutylene-isoprene copolymers.

Acrylic rubber is a rubber-like elastomer obtained by a polymerization of acrylic acid ester, or a copolymerization using acrylic acid ester as a main component.

Urethane rubber can be obtained by a polyaddition reaction of polyol and diisocyanate. The mixing ratio of polyol and diisocyanate, which are starting materials, is such that the NCO group of the diisocyanate is about 1 to 1.2 equivalents per equivalent of active hydrogen of the polyol. A prepolymer in which polyol and diisocyanate are polymerized can also be used. In this case, diisocyanate, polyol, or diamine can be added to the prepolymer as a curing agent. To prolong pot life, a block-type prepolymer in which the NCO terminal group of the diisocyanate prepolymer is blocked by a blocking agent may be used. Examples of the urethane rubber include polyester-based urethane rubber (AU) in which the main chain has an ester bond, and polyether-based urethane rubber (EU) in which the main chain has an ether bond. Specifically, URE- HYPER RUP1627 (prepolymer for block-type polyurethane, produced by DIC Corporation) can be used.

The rubber material used for the rubber-elastic layer preferably has a type A hardness (JIS K6253) of 80° or less and more preferably 30 to 60°. Here, the type A hardness is a value that indicates the softness of rubber. When the type A hardness exceeds 80°, the elastic layer is too hard, leading to a poor tracking ability over paper when paper with an uneven surface is used. As a result, stress is concentrated in the areas where the toner density is high during the primary transfer, and a missing defect on line image is thus likely to occur. On the other hand, when the type A hardness is less than 30°, the elastic layer is too soft, and stress generated when the belt is driven is easily concentrated on the surface layer. As a result, sufficient durability is less likely to be obtained.

One of the features of the present invention is that the filler is contained in the rubber-elastic layer of the intermediate transfer belt 1 in an amount of 0.4 to 4.0 vol. %, and that the filler is locally distributed in the surface layer side of the rubber-elastic layer. In the present specification, the surface layer side of the rubber-elastic layer indicates the region that is 20 μm or less from the surface layer side of the rubber-elastic layer.

The proportion of the filler in the rubber-elastic layer is 0.4 to 4.0 vol. %, and preferably 0.4 to 3.5 vol. %. In addition, the amount of the filler is preferably 0.8 to 10.0 parts by weight, and more preferably 1.0 to 8.0 parts by weight, relative to 100 parts by weight of the rubber or elastomer contained in the rubber-elastic layer. When the amount of the filler is too large, the hardness of the rubber-elastic layer as a whole becomes high, resulting in a tendency in which favorable images cannot be maintained. When the amount of the filler is too small, the portion that is in contact with the surface layer becomes undesirably soft, resulting in a tendency in which stress concentration on the surface layer cannot be prevented.

In the intermediate transfer belt 1 of the present invention, the filler is locally distributed to the surface layer side of the rubber-elastic layer. The extent of the local distribution of the filler can be expressed by the ratio of the mass concentration of the filler in the surface layer side of the rubber-elastic layer to the mass concentration of the filler in the other portion of the rubber-elastic layer. Specifically, the extent of the local distribution of the filler is explained below.

The mass concentration of the filler in the region (A in FIG. 3) from the interface between the surface layer and the rubber-elastic layer toward the base layer to a depth of 20 μm is referred to as the mass concentration $M_1$; the mass concentration of the filler in the region (B in FIG. 3) from 60 μm to 80 μm in depth from the interface between the surface layer and the rubber-elastic layer toward the base layer is referred to as the mass concentration $M_2$; and the mass concentration of the filler in the region (C in FIG. 3) from 120 μm to 140 μm in depth from the interface between the surface layer and the rubber-elastic layer toward the base layer is referred to as the mass concentration $M_3$.

The concentration ratio ($M_1/M_3$) of the mass concentration $M_1$ of the filler in the region from the interface between the surface layer and the rubber-elastic layer toward the base layer to a depth of 20 μm, to the mass concentration $M_3$ of the filler in the region from 120 μm to 140 μm in depth from the interface between the surface layer and the rubber-elastic layer toward the base layer is generally 1.3 or higher, preferably 1.5 or higher, more preferably 2.0 or higher, still more preferably 3.0 or higher and particularly preferably 3.0 to 30.

The concentration ratio ($M_1/M_2$) of the mass concentration $M_1$ of the filler in the region from the interface between the surface layer and the rubber-elastic layer toward the base layer to a depth of 20 μm, to the mass concentration $M_2$ of the filler in the region from 60 μm to 80 μm in depth from the interface between the surface layer and the rubber-elastic layer toward the base layer is generally 1.2 or higher, preferably 1.4 or higher, more preferably 1.5 or higher, still more preferably 2.5 or higher and particularly preferably 2.5 to 20.

The greater the mass concentration ratios ($M_1/M_3$ and $M_1/M_2$), the more the filler is present on the surface layer side of the rubber-elastic layer. When $M_1/M_3$ is 1.3 or higher and $M_1/M_2$ is 1.2 or higher, the rubber hardness is high only in the region in contact with the surface layer within the rubber-elastic layer. This is preferable because an intermediate transfer belt having excellent durability can be obtained while preventing stress concentration on the surface layer and maintaining high image quality. It is preferably $M_1 > M_2 > M_3$.

The concentration ratio of the filler within the above range indicates that the filler is locally distributed in the surface layer side of the rubber-elastic layer. Thus, the local distribution of the filler is preferable because the hardness of the entire rubber layer is not increased, and the hardness of only the portion that is in contact with the surface layer is increased, which prevents stress concentration on the surface layer.

The mass concentration of the filler is obtained by measuring the mass concentration of the primary element constituting the filler, using an energy dispersive X-ray analyzer (EDX) (acceleration voltage: 20 kV, and irradiation time: 5 minutes). For example, when the filler is aluminum borate, the concentration of aluminum is measured, and when the filler is mica, the concentration of silicon is measured.

The measurement using EDX is performed in 20 μm×20 μm areas. In each region, freely-selected 20 μm×20 μm areas (for example, the portions enclosed by the heavy line in FIG. 3) are measured three times, and the average thereof is defined as the concentration of the filler in the region.

The method for locally distributing the filler is not particularly limited. For example, a filler is locally distributed in a forcible manner to the surface layer side by centrifugal molding, etc., which is described later, to form a film.

Examples of the filler added include aluminum borate, potassium titanate, calcium silicate, boron nitride, aluminum nitride, aluminum oxide (alumina), titanium oxide, zirconium oxide, mica, talc, clay, hydrotalcite, silica, spherical silica, calcium carbonate, magnesium sulfate, zinc oxide, carbon black, PTFE, and the like. Of these, aluminum borate, mica, zirconium oxide, magnesium sulfate, barium sulfate, and spherical silica are preferable. In particular, particle-like zirconium oxide, barium sulfate, aluminum borate, and spherical silica are preferable. A filler may be suitably treated using a coupling agent, etc., according to a combination of a filler and a rubber-elastic layer.

The shape of the filler is not particularly limited. Examples thereof include needle-, particle-, sphere-, plate-, and fiber-like shapes. Each of them may be amorphous or a fixed form. In particular, from the viewpoint of reducing the frictional coefficient of the belt surface, reducing the image noise after intermediate transfer, etc., a particle- or sphere-like shape is preferable.

It is preferable that the volume average particle diameter (median diameter, D50) of the filler powder be 0.4 to 8 μm, preferably 0.5 to 5 μm, and particularly preferably 0.6 to 4 μm. An extremely large particle diameter causes a hardness variation in a narrow area on the belt surface, as in a filler having a large aspect ratio, resulting in a tendency for noise to be formed in images. In contrast, an extremely small particle diameter makes it difficult to locally distribute a filler in the surface layer side, thus the stress concentration on the surface layer may not be fully prevented, resulting in a tendency for cracking, etc., to occur in the surface layer.

The average particle diameter of the filler in the rubber-elastic layer of the intermediate transfer belt of the present invention can be measured by SEM cross-section observation, etc. Since the rubber-elastic layer is formed by dispersing a filler in a resin solution, agglomeration partially advances while removing a solvent or the like, and the average particle diameter of the filler in the rubber-elastic layer is likely to be slightly (about 1 to 2 μm) larger than the average particle diameter of the filler powder itself. Accordingly, when a filler powder having an average particle diameter of 0.4 to 8 μm is used, the average particle diameter of the filler in the rubber-elastic layer is about 1.4 to 10 μm.

The average aspect ratio (major axis/minor axis) of the filler in the present invention is preferably 5 or less, and more preferably 3 or less. The use of a needle- or plate-like filler having a large average aspect ratio causes a hardness variation in a narrow area on the belt surface, and when a halftone image with a low image density is printed out, noise is likely to be formed. In the present invention, "particle-like" indicates those having an average aspect ratio of more than 1.2 to 3 or less; and "sphere-like" indicates an average aspect ratio of 1 to 1.2.

The "average aspect ratio" in the present invention can be measured as follows. A filler is photographed at 1,000 to 10,000× magnification using a scanning electron microscope (SEM S-4800, produced by Hitachi, Ltd.), and a particle is randomly selected from particles in the resulting microphotograph. The major axis and the minor axis of the particle are measured using a ruler, and the ratio of the measured major axis and minor axis (major axis/minor axis) is defined as an aspect ratio. Nineteen other randomly selected particles are subjected to the same procedure, and the average of 20 aspect ratios in total is regarded as the average aspect ratio.

Figure 4:
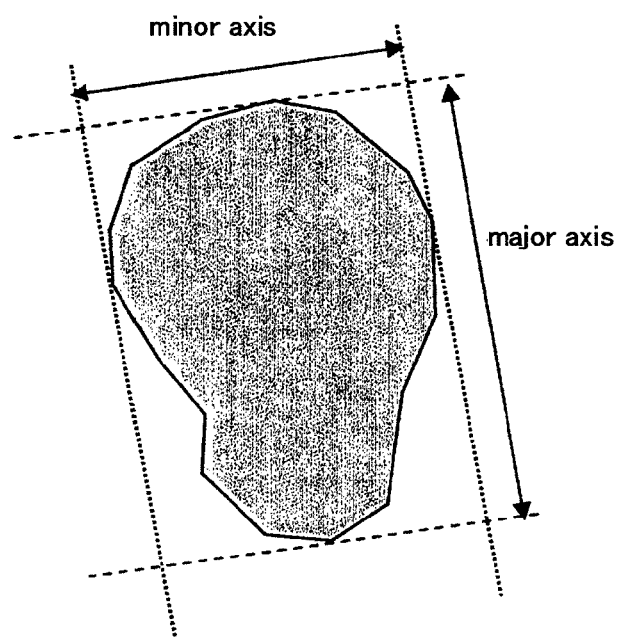
FIG. 4 shows a major axis and a minor axis in the aspect ratio measurement.
Figure 5:
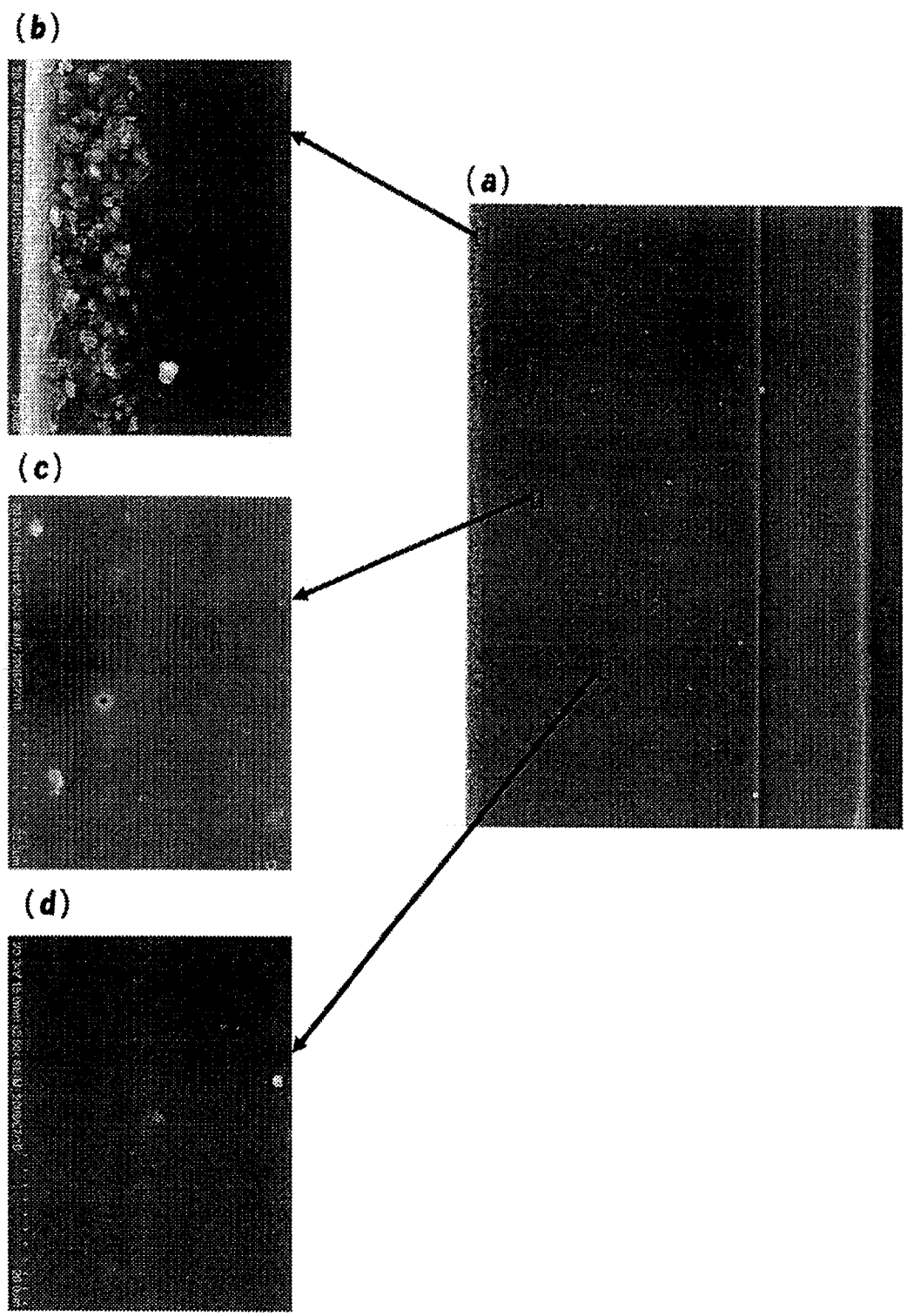
FIG. 5 shows SEM photographs of the section of the multilayer belt used in Example 1.

The minor axis of the filler particle in the microphotograph is obtained as follows. Combinations of two parallel lines that are in contact with the outer sides of the particle are selected in such a manner that the filler particle is sandwiched, and from these combinations, the combination of two parallel lines (dotted lines in FIG. 4) having the shortest distance is selected. On the other hand, the major axis is obtained as follows. Of the combinations of two parallel lines that are perpendicular to the parallel lines of the minor axis and that are in contact with the outer sides of the filler particle, the combination of two parallel lines having the longest distance (dashed line in FIG. 4) is referred to as the longest axis. The rectangle formed by these four lines has a size such that the filler particle exactly fits in the rectangle.

Further, a curing agent can be added, if necessary, to the composition for forming an elastic layer. For example, in the case of silicone rubber, hydrogen organopolysiloxane or the like can be used as a curing agent. In the case of urethane rubber, diisocyanate, polyol, or diamine can be used as a curing agent. These curing agents may be used by being added to the material for the rubber-elastic layer.

The curing agent may be added in an amount equivalent to the amount of the rubber base compound so that the ratio of the number of reactive functional groups in the rubber base compound to that in the curing agent is 1:1. In the case of a highly reactive material such as diisocyanate, the amount thereof is preferably 1 to 1.2 times that of the rubber base compound, considering facts such as that such a material reacts with moisture or the like in the environment and becomes inactive.

The solids content in the composition for forming an elastic layer can be suitably determined depending on the production method. Generally, it is preferably about 20 to 70 wt % including the filler.

The method for preparing the composition for forming an elastic layer is not particularly limited; however, it is preferable to mix materials using a ball mill or the like after they are blended together.

The thickness of the rubber-elastic layer is 200 to 400 μm, preferably 200 to 350 μm and more preferably 200 to 300 μm. Setting the thickness of the rubber-elastic layer within the above ranges is preferable because while it makes it possible to keep the contact pressure between the photo conductor and the transfer belt low and to prevent the "missing defects on line image" where the center of a line image is not transferred due to agglomeration of the toner on a photo conductor, it can also prevent color shift, which is likely to occur when the transfer belt is too thick.

(c) Surface Layer

The surface layer in the intermediate transfer belt 1 of the present invention is a layer for directly receiving toner, and transferring and releasing the toner to paper; therefore, excellent surface precision is desired. The surface layer is formed from a surface layer material in which a resin is dissolved or dispersed in an organic solvent or water.

Examples of the resin used in the surface layer include polyvinylidene fluoride, copolymers of vinylidene fluoride and hexafluoropropylene, polytetrafluoroethylene (PTFE), copolymers of tetrafluoroethylene and perfluoroalkyl vinyl ether (PFA), copolymers of tetrafluoroethylene and hexafluoropropylene (FEP), copolymers of tetrafluoroethylene and ethylene (ETFE), polyimide, polyamideimide, and the like. Of these, from the viewpoint of friction coefficient and wear and abrasion resistance, fluororesin is particularly preferable; and from the viewpoint of electrical properties, polyvinylidene fluoride and copolymers of vinylidene fluoride and hexafluoropropylene are particularly preferable.

A laminar clay mineral may be added to the surface layer. Examples of the laminar clay mineral include smectite, hydrotalcite, and the like.

The laminar clay mineral may be a natural product or a synthetic product. Examples thereof include Kunipia F produced by Kunimine Industries Co., Ltd., as a synthetic montmorillonite; Laponite XLG and Laponite Rd produced by Laporte, and Lucentite STN produced by CO-OP Chemical Co., Ltd., as a synthetic hectorite; and Smecton SA produced by Kunimine Industries, as a synthetic saponite. These products are industrially available.

The laminar clay minerals can be used singly or in a combination of two or more.

The proportion of the laminar clay mineral is preferably 0.1 to 5 wt %, more preferably 0.5 to 5 wt %, and even more preferably 1 to 5 wt %, based on the total amount of the surface layer. By adding the laminar clay mineral in such a proportion, less pinhole generation, excellent image transferability to rough paper, and excellent durability can be attained even when the thickness of the surface layer of the transfer belt is reduced.

In the present specification, excellent image transferability to rough paper indicates the following: when simple solid color printing with magenta is performed using extremely uneven paper such as bond paper, and the transfer of toner to the deepest portions (concave portions) is visually observed, the toner is transferred without unevenness, white streaks, etc.

The surface layer can be formed by applying a surface layer material that is obtained by dissolving or swelling the resin and optionally added laminar clay mineral in an organic solvent to the inner surface of a cylindrical mold, etc., followed by drying.

Examples of the organic solvent in which the resin is dissolved or swelled are not particularly limited. For example, organic solvent mixtures of aprotic polar solvents and other organic solvents can be used.

Examples of the aprotic polar solvent include N,N-dimethylacetamide, N,N-dimethylformamide, dimethylsulfoxide, N-methyl-2-pyrrolidone, and the like. Aprotic polar solvents selected from the above can be used singly or in a combination of two or more.

Other organic solvents include ketone-based solvents such as acetone, methyl ethyl ketone, methyl isobutyl ketone and cyclohexanone; ester-based solvents such as ethyl acetate and butyl acetate; and mixtures of solvents thereof.

In the present invention, it is desirable that a solution that is obtained by dissolving or swelling resin and a laminar clay mineral in an organic solvent and allowing it to stand for about 48 to 72 hours, after which no precipitation is observed, be used as a surface layer material.

The surface roughness (Rz) of the surface layer is preferably 0.25 to 1.5 μm, more preferably 0.4 to 1.3 μm, and even more preferably 0.6 to 1.2 μm. A layer having a surface roughness of less than 0.25 μm causes over load when driven because it is likely to stick to a sliding material such as a roll. A layer having a surface roughness of more than 1.5 μm causes toner sticking (filming) or image defects such as missing image. Therefore, a layer having a surface roughness outside the above range is not preferable. In the present invention, the surface roughness of the surface layer is measured at the surface layer of the intermediate transfer belt of the present invention comprising a base layer, an elastic layer, and a surface layer.

The thickness of the surface layer in the present invention is 0.5 to 6 μm, preferably 1 to 4 μm, and more preferably 2 to 4 μm. A surface layer having a thickness exceeding the above range is not preferable because the rubber-elasticity of the elastic layer is impaired. When the thickness of the surface layer is below the above range, a hole is likely to be generated, and other durability problems may occur.

The Young's modulus of the surface layer is preferably 300 to 2,000 MPa and more preferably 500 to 1,200 MPa. A surface layer having a Young's modulus of 2,000 MPa or less can prevent missing defects on line image caused by stress concentration on toner, while a surface layer having a Young's modulus of 300 MPa or more can prevent the friction coefficient of the surface layer from increasing, thereby preventing secondary transfer efficiency degradation. Thus, a surface layer having a Young's modulus in the above range is preferable.

The volume resistivity of the surface layer is preferably $1 \times 10^{12} \Omega \cdot cm$ or more, more preferably $1 \times 10^{12}$ to $1 \times 10^{15}$ {fourth root}·cm, and even more preferably $1 \times 10^{12}$ to $1 \times 10^{14} \Omega \cdot cm$. In the present invention, the volume resistivity of the surface layer indicates the volume resistivity of the single surface layer film having a thickness of 10 μm, which is obtained using a composition for forming the surface layer.

1.2 Intermediate Transfer Belt 2

The intermediate transfer belt 2 of the present invention has a dynamic ultramicro hardness measured from the surface layer side of 2.5 to 4.5 N/mm² at an indentation depth of 2 μm (i.e., when the indentation depth is fixed at 2 μm), and 1.0 N/mm² or less at an indentation depth of 10 μm (i.e., when the indentation depth is fixed at 10 μm). This indicates that the rubber-elastic layer has a high rubber hardness in the portion that is in contact with the surface layer (i.e., the portion 20 μm or less in depth from the interface with the surface layer. Giving the rubber-elastic layer such a rubber hardness prevents stress concentration on the surface layer, and achieves excellent durability while maintaining high image quality.

The dynamic ultramicro hardness can be measured by a method according to ISO14577-1, for example, using a dynamic ultramicro hardness tester (DUH-211/DUH-211S, produced by Shimadzu Corporation) and the like.

The measurement was performed at 5 different points in the same sample and the average value thereof was determined as the dynamic ultramicro hardness of the sample.

In the hardness measurement, the measurement value is generally influenced by the hardness of the portion from the surface to a depth of 10 times the indentation depth. More specifically, when the hardness is measured at an indentation depth of 2 μm, the measured value indicates the hardness of the portion at a depth of about 20 μm from the surface. The measurement value of hardness at the load rate of 0.1463 mN/sec and indentation depth of 2 μm is generally 2.5 to 4.5 N/mm², preferably 2.5 to 4.2 N/mm², and more preferably 2.5 to 4.0 N/mm². By having the hardness within the above ranges, durability sufficient to withstand a 100,000 sheet pass-through test can be attained.

When hardness is measured at an indentation depth of 10 μm, it means that the hardness of the portion from the surface to a depth about 100 μm is measured. The hardness measurement value at a load rate of 0.1463 mN/sec and indentation depth of 10 μm is generally 1.0 N/mm²⁰r less, preferably 0.3 to 1.0 N/mm², and more preferably 0.5 to 0.9 N/mm². By having the hardness within the above ranges, an intermediate transfer belt that is excellent in preventing "missing defects on line image" and in providing desirable "image transferability to rough paper" and the like can be obtained.

Base Layer (a) and Surface Layer (c)

The base layer (a) and surface layer (c) of the intermediate transfer belt 2 of the present invention may be the same as those of the intermediate transfer belt 1.

Rubber-Elastic Layer (b)

As in the case of the intermediate transfer belt 1, an elastic layer is provided in the intermediate transfer belt 2 of the present invention primarily to improve the tracking ability over uneven paper surface and to prevent missing defects on line image caused by a concentration of stress on toner while transferring images. The rubber-elastic layer is formed from a composition for forming an elastic layer comprising rubber or elastomer (hereunder, this may be referred to as a rubber material).

The rubber materials for forming the rubber-elastic layer are not particularly limited as long as they can achieve a dynamic ultramicro hardness measured from the surface layer side of 2.5 to 4.5 N/mm² at an indentation depth of 2 μm, and 1.0 N/mm² or less at an indentation depth of 10 μm. Specific examples thereof are the same as those used for the intermediate transfer belt 1.

The rubber material used for the rubber-elastic layer preferably has a type A hardness (JIS K6253) of 80° or less and more preferably 30 to 60°. Here, the type A hardness is a value that indicates the softness of rubber. When the type A hardness exceeds 80°, the elastic layer is too hard, leading to a poor tracking ability over paper when paper with an uneven surface is used. As a result, stress is concentrated in the areas where the toner density is high during the primary transfer, and missing defects on line image are thus likely to occur. On the other hand, when the type A hardness is less than 30°, the elastic layer is too soft, and stress generated when the belt is driven is easily concentrated on the surface layer. As a result, sufficient durability is less likely to be obtained.

A filler may be added to the composition for forming the elastic layer of the intermediate transfer belt 2. As in the case of the intermediate transfer belt 1, it is preferable that more filler be present at the surface layer side of the rubber-elastic layer.

When the filler is added to the composition for forming an elastic layer of the intermediate transfer belt 2, the mass concentration ratios ($M_1/M_2$ and $M_1/M_3$) are preferably in the following ranges, wherein $M_1$ is the mass concentration of the filler in the region (A in FIG. 3) from the interface between the surface layer and the rubber-elastic layer toward the base layer to a depth of 20 μm; $M_2$ is the mass concentration of the filler in the region (B in FIG. 3) from 60 μm to 80 μm in depth from the interface between the surface layer and the rubber-elastic layer toward the base layer; and $M_3$ is the mass concentration of the filler in the region (C in FIG. 3) from 120 μm to 140 μm in depth from the interface between the surface layer and the rubber-elastic layer toward the base layer.

The concentration ratio ($M_1/M_3$) of the mass concentration $M_1$ of the filler in the region from the interface between the surface layer and the rubber-elastic layer toward the base layer to a depth of 20 μm, to the mass concentration $M_3$ of the filler in the region from 120 μm to 140 μm in depth from the interface between the surface layer and the rubber-elastic layer toward the base layer is generally 1.3 or higher, preferably 1.5 or higher, more preferably 2.0 or higher, still more preferably 3.0 or higher and particularly preferably 3.0 to 30.

The concentration ratio ($M_1/M_2$) of the mass concentration $M_1$ of the filler in the region from the interface between the surface layer and the rubber-elastic layer toward the base layer to a depth of 20 μm, to the mass concentration $M_2$ of the filler in the region from 60 μm to 80 μm in depth from the interface between the surface layer and the rubber-elastic layer toward the base layer is generally 1.2 or higher, preferably 1.4 or higher, more preferably 1.5 or higher, still more preferably 2.5 or higher and particularly preferably 2.5 to 20.

The greater the mass concentration ratios ($M_1/M_3$ and $M_1/M_2$), the more the filler is present on the surface layer side of the rubber-elastic layer. When $M_1/M_3$ is 1.3 or higher and $M_1/M_2$ is 1.2 or higher, the rubber hardness is high only in the region in contact with the surface layer within the rubber-elastic layer. This is preferable because an intermediate transfer belt having excellent durability can be obtained while preventing stress concentration on the surface layer and maintaining high image quality. It is preferably $M_1 > M_2 > M_3$.

Here, the mass concentration of the filler is the same as that defined for the intermediate transfer belt 1, and the method for measuring the mass concentration, the method for locally distributing filler, and the like are the same as those for the intermediate transfer belt 1.

The amount of filler is preferably 0.8 to 10.0 parts by weight, and more preferably 1.0 to 8.0 parts by weight relative to 100 parts by weight of the rubber or elastomer contained in the rubber-elastic layer. The proportion of the filler to the rubber-elastic layer is preferably 0.2 to 5.0 vol. %, more preferably 0.3 to 4.5 vol. %, and even more preferably 0.4 to 4.0 vol. %. When the amount of filler is too large, the hardness of the rubber-elastic layer as a whole becomes high, resulting in a tendency in which favorable images cannot be maintained. When the amount of filler is too small, the portion that is in contact with the surface layer becomes undesirably soft, resulting in a tendency in which stress concentration on the surface layer cannot be prevented.

Examples of usable fillers are the same as those listed for the intermediate transfer belt 1.

Further, a curing agent can be added, if necessary, to the composition for forming an elastic layer. For example, in the case of silicone rubber, hydrogen organopolysiloxane or the like can be used as a curing agent. In the case of urethane rubber, diisocyanate, polyol, or diamine can be used as a curing agent. These curing agents may be used by being added to the material for the rubber-elastic layer.

The curing agent may be added in an amount equivalent to the amount of the rubber base compound so that the ratio of the number of reactive functional groups in the rubber base compound to that in the curing agent is 1:1. In the case of a highly reactive material such as diisocyanate, the amount thereof is preferably 1 to 1.2 times that of the rubber base compound, considering facts such as that such a material reacts with moisture or the like in the environment and becomes inactive.

The solids content in the composition for forming an elastic layer can be suitably determined depending on the production method. Generally, it is preferably about 20 to 70 wt % including the filler.

The method for preparing the composition for forming an elastic layer is not particularly limited; however, it is preferable to mix materials using a ball mill or the like after they are blended together.

The rubber-elastic layer may be formed from two or more layers having different degrees of hardness. For example, when the rubber-elastic layer is formed from a number n of rubber layers, these layers are defined as, starting with the layer that is closest to the surface layer, the first rubber layer, the second rubber layer, . . . , and the $n^{th}$ rubber layer (the rubber layer that is closest to the base layer). In this case, it is preferable that the first rubber layer have the highest type A hardness, and that the type A hardness become smaller as it approaches the base layer side. For example, when the rubber-elastic layer is formed from two rubber layers, it is preferable that the first rubber layer located toward the surface layer side have a thickness of 5 to 50 μm and a type A hardness of 70 to 95°, and the second rubber layer located toward the base layer side have a thickness of 95 to 350 μm and a type A hardness of 30 to 60°.

The thickness of the rubber-elastic layer is 200 to 400 μm, preferably 200 to 350 μm and more preferably 200 to 300 μm. Setting the thickness of the rubber-elastic layer within the above ranges is preferable because while it makes it possible to keep the contact pressure between the photo conductor and the transfer belt low and to prevent the "missing defects on line image" where the center of a line image is not transferred due to agglomeration of the toner on a photo conductor, it can also prevent color shift, which is likely to occur when the transfer belt is too thick.

1.3 Intermediate Transfer Belt 3

The intermediate transfer belt 3 of the present invention possesses the characteristics of both the intermediate transfer belts 1 and 2, i.e., (i) and (ii) described above. More specifically, the intermediate transfer belt 3 combines various embodiments of the intermediate transfer belts 1 and 2 described above. Therefore, the intermediate transfer belt 3 achieves excellent effects equal to or better than the intermediate transfer belts 1 and 2.

1.4 Properties of the Intermediate Transfer Belt

Each of the intermediate transfer belts of the present invention has the following properties.

IRHD Value of the Intermediate Transfer Belt

The intermediate transfer belt has an IRHD value of preferably 82 or less, and more preferably 50 to 82. By setting the IRHD value within the above range, an intermediate transfer belt having an excellent "image transferability to rough paper" can be obtained. The IRHD value can be measured according to JIS K6253.

Surface Roughness of the Intermediate Transfer Belt

The intermediate transfer belt preferably has a high surface precision whose surface roughness on the surface layer defined as a ten-point mean roughness (Rz: JIS B0601-1994) is preferably about 0.25 to 1.5 µm, more preferably about 0.4 to 1.3 µm, and even more preferably about 0.6 to 1.2 µm.

Coefficient of Static Friction and Volume Resistivity on the Surface of the Intermediate Transfer Belt The surface of the intermediate transfer belt of the present invention has a coefficient of static friction of preferably 0.1 to 1, more preferably about 0.2 to 0.8, and even more preferably 0.2 to 0.4. The intermediate transfer belt of the present invention preferably has a surface resistivity of about $1\times10^{10}$ to $1\times10^{15}$ Ω/☐, and a volume resistivity of about $1\times10^{8}$ to $1\times10^{14}$ Ω·cm. These values are variable within the aforementioned ranges depending on the amount of the conductive agent added to the elastic layer and/or the base layer.

The intermediate transfer belt of the present invention has an average total thickness of generally about 100 to 400 µm, and preferably about 150 to 350 µm. The thickness of each layer can be suitably determined in view of the stress applied to the belt when driven and its flexibility. The proportion of the thickness of each layer is, when the thickness of the base layer is defined as 1, the thickness of the elastic layer is generally about 1.5 to 5.0 and preferably about 2 to 4; and the thickness of the surface layer is about 0.005 to 0.05. By employing the three-layered structure as described above, variations in the thickness of the belt can be reduced to obtain a uniform belt.

2. Method for Producing an Intermediate Transfer Belt for Image-Forming Devices

There is no particular limitation to the method for producing an intermediate transfer belt for image-forming devices having the structure described above, and an example thereof is described below.

The intermediate transfer belt for an image-forming device of the present invention can be produced by a method comprising the following steps:

(1) subjecting resin to centrifugal molding or melt extruding to form a base layer;

(2) dissolving or swelling resin in an organic solvent to prepare a solution, and subjecting the solution to centrifugal molding using a cylindrical mold to form a surface layer having a thickness of 0.5 to 6 µm;

(3) forming a rubber-elastic layer having a thickness of 200 to 400 µm on the inner surface of the surface layer obtained in (2) by subjecting a material for the rubber-elastic layer containing a filler (a composition for forming an elastic layer) to centrifugal molding on the inner surface to form a two-layered film; and (4) placing the outer surface of the base layer obtained in (1) onto the inner surface of the rubber-elastic layer of the two-layered film obtained in (3), and performing a heat treatment.

Alternatively, the intermediate transfer belt of the present invention can be produced in the following manner. That is, after forming a surface layer and a base layer by Steps (1) and (2) respectively, (3') placing the outer surface of the base layer onto the inner surface of the surface layer, injecting a material for an elastic layer between the two layers, and then performing a heat treatment.

Each step is explained below. The materials used in the production method of the present invention, the contents thereof, and the like are as described above.

Step (1): Forming a Base Layer

A base layer can be formed as follows.

First, an example using a polyimide, which is a typical material for the base layer, is explained.

As described above, tetracarboxylic dianhydride and diamine, which are the starting materials for the polyimide, are reacted in NMP or a like solvent to preliminarily prepare a polyamic acid solution. In order to impart desirable semi-conductivity to the base layer, carbon black or a like conductive agent is added to the polyamic acid solution, giving a polyamic acid containing carbon black dispersed therein (a composition for forming a base layer).

Using the composition for forming the base layer thus obtained, centrifugal molding is performed using a rotary drum (cylindrical mold) or the like. Heating can be performed by gradually heating the inner surface of the drum to about 100 to 190° C., and preferably to about 110 to 130° C. (first heating step). The heating rate can be about 1 to 2° C./min. The aforementioned temperature is maintained for 20 minutes to 3 hours so that approximately half or more of the solvent is volatized, thereby forming a self-supporting tubular belt.

The rotation speed of the rotary drum in the first heating step is preferably a centrifugal acceleration of 0.5 to 10 times the gravitational acceleration. The gravitational acceleration (g) is generally 9.8 (m/s$^2$).

The centrifugal acceleration (G) is given by the following formula.

$$G(m/s^2)=r\cdot\omega^2=r\cdot(2\cdot\pi\cdot n)^2 \quad (I)$$

where r represents the radius (m) of the cylindrical mold, ω represents the angular velocity (rad/s), and n represents the number of rotations per second (rpm indicates the number of rotations per 60 seconds). The rotation conditions for the cylindrical mold can be suitably selected based on Formula (I) above.

Thereafter, a second heating step is performed at about 280 to 400° C., and preferably at about 300 to 380° C., to complete the imidization. Also in this step, it is preferable that the temperature be gradually increased from the temperature of the first heating step until it reaches the predetermined temperature rather than rapidly heating the inner surface of the drum to reach the aforementioned temperature. The second heating step may be performed with the tubular belt still adhered to the inner surface of the rotary drum. It is also possible to perform the second heating step by peeling and removing the tubular belt from the rotary drum after the completion of the first heating step, and supplying the tubular belt to a separate heating means for imidization, followed by heating to 280 to 400° C. Such imidization usually takes about 20 minutes to 3 hours.

Similarly, in the case when a polyamideimide is used as a material for the base layer, diamine or diisocyanate that is derived from diamine is reacted with trimellitic acid in a solvent to directly obtain a polyamideimide, and the result is subjected to centrifugal molding to obtain a seamless polyamideimide base layer.

When polycarbonate, PVdF, ethylene-tetrafluoroethylene copolymer, polyamide, polyphenylene sulfide and the like are used as the materials for the base layer, a seamless base layer can be formed by melting and extrusion molding these resins.

A seamless base layer is thus formed.

Step (2): Forming a Surface Layer

A surface layer can be formed as follows.

The composition for forming the surface layer is subjected to centrifugal molding using a cylindrical mold having a surface roughness (Rz) of 0.25 to 1.5 µm. In this case, the thickness of the resulting surface layer is adjusted to about 0.5 to 6 µm.

The centrifugal molding for forming a surface layer can be performed as follows. For example, the composition for forming the surface layer is injected, in an amount sufficient to provide the desired final thickness, into the inner surface of a rotary drum (cylindrical mold) rotating at a centrifugal acceleration that is about 0.5 to 10 times the gravitational acceleration, and the rotation speed is then gradually raised to a centrifugal acceleration that is about 2 to 20 times the gravitational acceleration to cast the composition uniformly over the entire inner surface by means of the centrifugal force.

The rotary drum has an inner surface that is ground to a predetermined surface precision, and the condition of the surface of the rotary drum is substantially transferred to the outer surface of the surface layer of the intermediate transfer belt of the present invention. Accordingly, by controlling the surface roughness of the inner surface of the rotary drum, the surface roughness of the surface layer can be adjusted within a desirable range. When the average surface roughness (Rz) of the inner surface of the rotary drum is adjusted to the range of 0.25 to 1.5 µm, a surface layer having a surface roughness (Rz) almost corresponding to that of the inner surface of the rotary drum, i.e., 0.25 to 1.5 µm, can be formed. However, because the measurement value of the surface roughness of the surface layer of an intermediate transfer belt is apt to be influenced by slight deflections and/or waviness, it tends to be slightly higher relative to the average surface roughness (Rz) of the inner surface of the rotary drum. Therefore, it is possible to use a rotary drum having an inner surface with an average surface roughness (Rz) slightly lower than the desired surface roughness of the surface layer of the belt. Note that the surface precision of the inner surface of the mold can be desirably controlled by suitably selecting the grade of the abrasive paper used in finishing the inner surface thereof.

The rotary drum is placed on rotary rollers, and is rotated indirectly by rotating the rollers. The size of the drum can be suitably selected depending on the desired size of the intermediate transfer belt.

A far-infrared radiation heater or the like is arranged around the drum, and heating is performed indirectly by such an external heat source. The heating temperature may be varied depending on the type of resin, and is usually from room temperature to around the melting point. More specifically, when the melting point of a resin is defined as Tm, the temperature is gradually increased to generally about $(Tm\pm40)°$ C., and preferably about $(Tm-40)°$ C. to $Tm°$ C., and heating may be performed at the raised temperature for about 10 to 60 minutes. This allows a seamless tubular surface layer to be formed on the inner surface of the drum.

Step (3): Forming a Two-Layered Structure

An elastic layer is formed on the inner surface of the surface layer obtained in Step (2) described above by subjecting a material for the elastic layer to centrifugal molding on the inner surface, thereby forming a two-layered film.

The composition for forming the elastic layer described above is uniformly applied to the inner surface of the surface layer of the rotary drum (cylindrical mold) provided with the surface layer, followed by centrifugal molding. Thereafter, a heat treatment is performed while rotating the rotary drum at a centrifugal acceleration that is about 2 to 20 times (preferably 4 to 20 times) the gravitational acceleration. Heating can be performed so that the inner surface of the drum is gradually heated to reach the temperature of about 90 to 180° C., and preferably about 90 to 150° C. The heating rate may be, for example, about 1 to 3° C./min. The aforementioned temperature is maintained for 20 minutes to 3 hours so as to form a two-layered film in the drum. The two-layered film comprises a surface layer and an elastic layer formed thereon.

When the rubber-elastic layer is formed into a two-layered structure, a material for the elastic layer is further subjected to centrifugal molding on the inner surface of the rubber-elastic layer that was previously formed, and the two layers are simultaneously cured by heating.

Step (4): Forming a Three-Layered Structure

The outer surface of the base layer obtained in Step (1) described above and the inner surface of the elastic layer of the two-layered film (comprising a surface layer and an elastic layer) obtained in Step (3) described above are laminated and subjected to a heat treatment.

More specifically, a known primer for adhesion or the like is applied to the inner surface of the elastic layer of the two-layered film formed in the rotary drum, and then dried by air. Thereafter, a base layer, to which an adhesive for dry lamination or the like is applied on its outer surface, is inserted in the rotary drum and placed on the elastic layer. The two laminated layers are adhered to each other by pressing from the inner surface of the belt, and the inner surface of the cylindrical mold is gradually heated to about 40 to 120° C., and preferably to about 50 to 90° C.

The heating rate may be, for example, about 1 to 10° C./min. The aforementioned temperature is maintained for 2 to 30 minutes to form a three-layered belt, which comprises the surface layer, the elastic layer and the base layer, in the cylindrical mold.

The laminated three-layered belt is removed from the cylindrical mold and both ends of the belt are cut so as to have a desired width to produce a three-layered intermediate transfer belt.

Instead of conducting Steps (3) and (4) in the production method described above, a three-layered intermediate transfer belt can also be produced by placing the inner surface of the surface layer on the outer surface of the base layer, injecting a material for an elastic layer between the two layers, and then performing a heat treatment to simultaneously form an elastic layer and a three-layered structure (Step (3')).

Step (3'): Forming an Elastic Layer and Three-Layered Structure

The surface layer and the base layer separately formed according to Steps (1) and (2), respectively, are laminated in such a manner that the inner surface of the surface layer contacts the outer surface of the base layer, and a material for an elastic layer is injected between the two layers. In order to obtain a uniform elastic layer, ironing is preferably performed from one end of the inner surface of the base layer to the other end. An intermediate transfer belt can be obtained by subjecting the resulting laminate to a heat treatment. Note that it is preferable that the two layers be in a sealed condition after the lamination.

For example, when silicone rubber is used as a rubber-elastic resin, by heating the laminate obtained by the injection method to about 110 to 220° C., the material for the elastic layer is vulcanized (cross linked and cured), and, at the same time, the surface layer and the base layer can be firmly adhered to the elastic layer.

When the rubber-elastic resin is formed from urethane rubber, it is preferable that the two liquids are mixed immediately before forming the film.

A specific example of the process for forming a three-layered structure is described below.

A known primer for adhesion or the like is applied to the inner surface of the surface layer formed on the inner surface of the drum, and then dried by air. A primer is also applied to the outer surface of the formed base layer and the base layer is placed on the inner surface of the surface layer. An O-ring is pressed against both ends of the tubular belt from the inside under reduced pressure to put the laminated surface layer and base layer in a sealed condition. Subsequently, the composition for forming an elastic layer described above is inserted into the space between the two layers by an injection method and the composition for forming an elastic layer is then cast using a metal roll from the inner surface of the base layer to make it uniform in the circumferential direction.

The following example may be mentioned as another embodiment.

A known primer for adhesion is uniformly applied to the inner surface of a surface layer that is formed on the inner surface of a drum. A primer is also applied to the outer surface of a formed base layer, and the result is placed on the outer surface of a cylindrical core body. The core body is inserted into the inner surface of the drum onto which the surface layer has been formed, and the core body and the drum are coaxially fixed. Subsequently, a paste-like composition for forming an elastic layer is injected from one side of the drum to the space between the two layers. The drum is fixed by a pair of jigs that hold its right and left ends in the longitudinal direction. One jig is provided with an inlet for the material for an elastic layer and the other jig is provided with an outlet therefor.

The heat treatment after the formation of three-layered structure is performed as follows. The temperature is gradually increased to 110 to 220° C. (for example, heating rate of about 1 to 3° C./min.), and the belt is treated at the aforementioned temperature for 0.5 to 4 hours. Thereby, the crosslinking and curing of a belt are completed. After the completion of heat treatment, the drum is cooled, the tubular belt formed into a three-layered structure is removed from the inner surface of the drum, obtaining the intermediate transfer belt of the present invention.

The use of the primer for adhesion described above is optional; however, the use thereof is preferable in order to enhance the adhesive strength. An example of a primer for adhesion is DY 39-067, produced by Dow Corning Toray Co., Ltd.

The intermediate transfer belt of the present invention obtained by the method described above exhibits excellent durability while maintaining high image quality; therefore, it can be desirably used as an intermediate transfer belt for image-forming devices employing an electrophotographic system such as copying machines (including color copying machines), printers and facsimiles.

EXAMPLES

The present invention will be described below in more detail with reference to Test Examples, etc. However, the present invention is not limited thereto or thereby.

The methods for measuring the following physical properties are shown.

Surface Roughness

The surface roughness ($\mu$m) was measured according to JIS B0601-1994. Using a laser microscope produced by Keyence Corporation, VK-9700, as a measuring apparatus, and the belt surface was observed with a magnification of 1,000× using an objective lens (20×)×an ocular lens (50×). Using the images of the belt surface obtained in the observation, the line roughness was measured under the following conditions.

Inclination correction: plane inclination correction (automatic)
Cutoff: None
Measurement length: 0.25 mm The measurement was performed at five different points on the surface of the same belt. The average of the ten-point mean roughness (Rz) was defined as the surface roughness.

Static Friction Coefficient

The measurement was performed at ten different points on the surface of the same belt using the Heidon 94i produced by Sinto Scientific Co., Ltd. The average of the measurements was defined as the static friction coefficient.

Surface Resistivity and Volume Resistivity

The surface resistivity ($\Omega$/✇) and the volume resistivity ($\Omega$·cm) were measured using a resistance meter produced by Mitsubishi Chemical Corporation, called the Hiresta IP/HR probe. The belt was cut to a length of 360 mm in the width direction, and used as a sample. After a voltage of 100 V was applied for 10 seconds, each of the surface resistivity and volume resistivity was measured at 12 points in total, i.e., 3 points in the width direction and 4 points in the vertical (circumferential) direction at the same pitch. The average of the measurements was defined as the resistivity.

Young's Modulus

Young's modulus was measured according to JIS K7127 using the Autograph AG-X produced by Shimadzu Corporation.

Sample piece: 25×250 mm strip
Pulling speed: 20 mm/min

Dynamic Micro Hardness

Using a dynamic ultra micro hardness tester (DUH-211S, produced by Shimadzu Corporation), the hardness was measured at an indentation depth of 2 $\mu$m and 10 $\mu$m under the conditions shown below. The hardness at each indentation depth was measured at five different points on the surface of the same belt. The average of the measurements was defined as the dynamic micro hardness.

Test device: Shimadzu dynamic ultra micro hardness tester DUH-211S
Test mode: Loading and unloading test
Loading rate: 0.1463 mN/sec
Minimum test force: 0.02 mN
Load time: 2 seconds
Cf-Ap, As corrected
Indenter: Triangular 115 (a Berkovich-shaped diamond triangular pyramid indenter; angle between edges: 115°)

Confirmation of Uneven Distribution of the Filler

The cross section of the belt was sliced with a microtome. Gold was vapor-deposited thereon to a deposition thickness of 5 nm to prepare a sample for observation. The cross section of the sample was observed under a scanning electron microscope (S-4800, SEM produced by Hitachi Ltd.).

Using an EDX (EMAX Model 7593H, an energy dispersive X-ray analyzer produced by Horiba, Ltd., accelerating voltage: 20 kV, irradiation time: 5 min), the mass concentrations of the filler contained in the following three regions were measured: the mass concentration $M_1$ in the region from the interface between the surface layer and the rubber-elastic layer toward the base layer to a depth of 20 $\mu$m; the mass concentration $M_2$ in the region from the interface between the surface layer and the rubber-elastic layer toward the base layer to a depth of 60 to 80 $\mu$m; and the mass concentration $M_3$ in the region from the interface between the surface layer and the rubber-elastic layer toward the base layer to a depth of 120 to 140 $\mu$m. Their concentration ratios ($M_1/M_2$ and $M_1/M_3$) were obtained.

The filler mass concentration measurement using the EDX was performed by measuring the mass concentration of the primary element constituting the filler (for example, when the filler was aluminum borate, the concentration of aluminum was measured; when the filler was mica, the concentration of silicon was measured; when the filler was zirconium oxide, the concentration of zirconium was measured). In this measurement, the mass concentration of gold that was vapor-deposited for observation was subtracted from the total mass concentration so that the total mass concentration excluding gold became 100%. The measurement using the EDX was performed at freely selected 20 μm×20 μm areas in each region three times. The average of the measurements was defined as the filler concentration in the region.

Example 1

(1) Formation of the Base Layer

Under a nitrogen flow, 47.6 g of 4,4'-diaminodiphenylether (ODA) was added to 488 g of N-methyl-2-pyrrolidone. The mixture was maintained at 50° C. while stirring to achieve complete dissolution. To this solution was added 70 g of 3,3',4,4'-biphenyl tetracarboxylic dianhydride (BPDA) to yield 605.6 g of a polyamic acid solution. The obtained polyamic acid solution had a number average molecular weight of 19,000, a viscosity of 40 poise, and a solids content of 18.1 wt. %.

Subsequently, 21 g of acidic carbon black (pH 3.0) and 80 g of N-methyl-2-pyrrolidone were added to 450 g of the polyamic acid solution. Carbon black (CB) was uniformly dispersed using a ball mill. This master batch solution had a solids content of 18.6 wt. %, and a CB concentration of 20.5 wt. % in the solids content.

Figure 1:
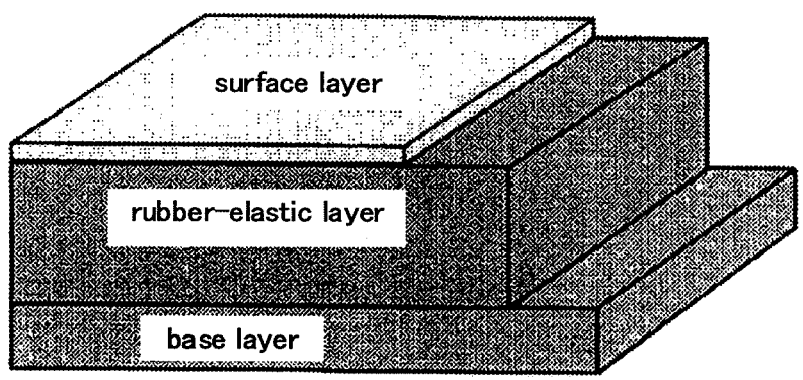
FIG. 1 is a cross sectional view of the intermediate transfer belt of the present invention.
Figure 2:
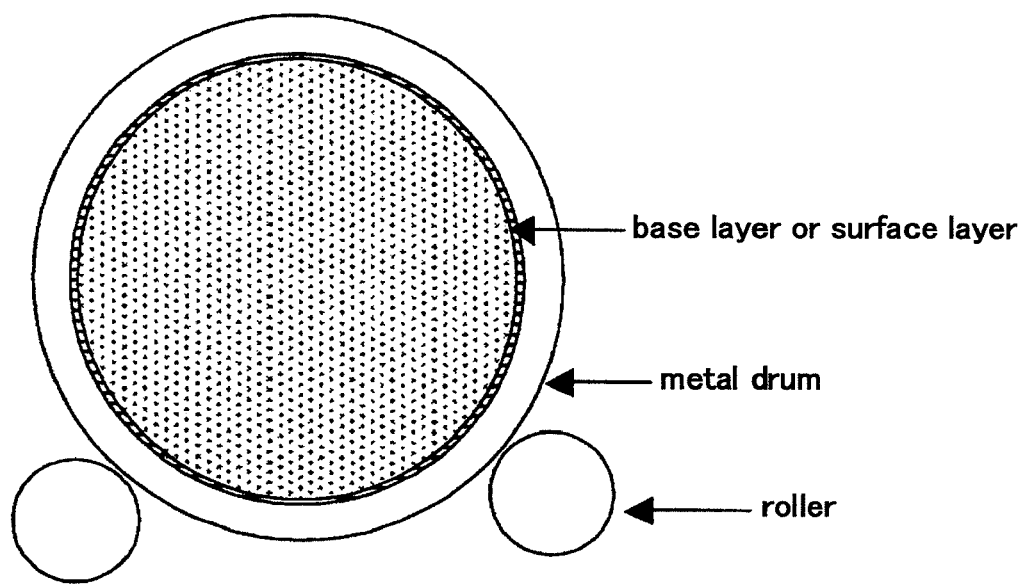
FIG. 2 is a schematic view of the device used for forming a film in the present invention.

Then, 273 g of the solution was collected and poured into a drum. The solution was molded under the following conditions:

Rotary drum: A metal drum with a mirror-finish inner surface having an inner diameter of 301.5 mm and a width of 540 mm was placed on two rotary rollers, and arranged so that the drum would rotate with the rotation of the rollers (see, for example, FIG. 2).

Heating temperature: A far-infrared radiation heater was arranged around the outer surface of the drum to control the inner surface temperature of the drum to 120° C.

First, while rotating the rotary drum, 273 g of the solution was uniformly applied to the inner surface of the drum, and heating was initiated. The heating was performed by raising the temperature at a rate of 1° C./min to 120° C., and then heating at 120° C. for 60 minutes while rotating the drum.

After the rotation and heating, the rotary drum was detached as is, without cooling, and allowed to stand in a hot air convection oven to initiate heating for imidization. The heating was performed by gradually raising the temperature to 320° C., and then heating at 320° C. for 30 minutes. After the heating, the drum was cooled to room temperature, and a semiconductive tubular polyimide belt formed on the inner surface of the drum was peeled off. The belt had a thickness of 79 μm, an outer circumferential length of 944.3 mm, a surface resistivity of $2\times10^{11}$ to $4\times10^{11}$ Ω/☐, and a volume resistivity of $1\times10^{9}$ to $3\times10^{9}$ Ω·cm.

(2) Formation of the Surface Layer 100 g of a VdF-HFP copolymer resin (Kynar #2821, produced by Arkema Inc.: HFP 11 mol %), i.e., a copolymer of vinylidene fluoride (VdF) and hexafluoropropylene (HFP), was dissolved in 900 g of N,N-dimethylacetamide (DMAc) to prepare a Solution A with a solids content of 10 wt. %.

100 g of an organic-modified montmorillonite (Lucentite STN, produced by CO-OP Chemical Co., Ltd.) was added to 900 g of dimethylacetamide. The mixture was uniformly dispersed using a ball mill to prepare a Solution B with a solids content of 10 wt. %.

Solutions A and B were blended at a ratio of A:B=99:1, and mixed using a paint shaker to prepare a solution with a solids content of 10 wt. % and with an organic modified montmorillonite concentration of 1 wt. % within the solids content. This solution was diluted with a mixed solvent of DMAc and butyl acetate (DMAc:butyl acetate=1:2) to prepare a solution (hereinafter sometimes referred to as the "surface layer material") with a solids content of 1.6 wt. % and with an organic modified montmorillonite concentration of 1 wt. % within the solids content (corresponding to the proportion of montmorillonite to the total weight of the surface layer). A layer was formed using 112 g of this solution under the following conditions.

Rotary drum: A metal drum with an inner diameter of 301.0 mm, a width of 540 mm, and an inner surface ten-point mean roughness (Rz) of 0.5 μm was placed on two rotary rollers, and arranged so that the drum would rotate with the rotation of the rollers (see, for example, FIG. 2).

While rotating the rotary drum, the solution was uniformly applied to the inner surface of the drum, and heating was initiated. The heating was performed by raising the temperature at a rate of 2° C./min to 130° C., and then heating at 130° C. for 20 minutes while rotating the drum. After a surface layer was formed on the inner surface of the drum, the drum was cooled to room temperature. The thickness of the surface layer formed on the inner surface of the drum was measured using an eddy-current coating thickness tester (produced by Kett Electric Laboratory). The thickness of the surface layer was 2 μm.

Using the above surface layer material, another surface layer with a thickness of 10 μm was produced under the same formation conditions. The 10-μm-thick surface layer had a volume resistance of $4\times10^{12}$ Ω·cm, a Young's modulus of 610 MPa, and a surface roughness (Rz) of 0.6 μm.

(3) Formation of the Elastic Layer

A solution of 141.3 g of a blocked urethane prepolymer (URE-HYPER RUP 1627, produced by DIC Corporation) in 188 g of toluene was prepared. As a filler, 1.52 g of whisker-shaped aluminum borate (Alborex, produced by Shikoku Chemicals Corporation, average particle diameter D50=8 μm) was added thereto, and uniformly dispersed using a ball mill. Further, 11.07 g of an aliphatic diamine curing agent CLH-5 (produced by DIC Corporation) was added to the dispersion and stirred.

The dispersion thus obtained had a solids content of 45 wt. %, and an aluminum borate content of 1.0 wt. % within the solids content, and a volume fraction of aluminum borate of 0.4% within the solids content. While rotating the drum, this dispersion was uniformly applied to the inner surface of the surface layer previously formed, and heating was initiated. The heating was performed by raising the temperature at a rate of 1° C./min to 150° C., and then heating at 150° C. for 30 minutes while rotating the drum to form a rubber-elastic layer inside the drum.

In this heating step, the rotary drum was rotated at a centrifugal acceleration that was 7.4 times the gravitational acceleration.

Gravitational acceleration (g) is generally 9.8 (m/s$^2$).

Centrifugal acceleration (G) is given by the following Formula (I):

$$G(m/s^2) = r \cdot \omega^2 = r \cdot (2 \cdot \pi n)^2 \quad (I)$$

wherein r is the radius (m) of a cylindrical mold, ω is angular velocity (rad/s), and n is the number of rotations per second (rpm for the number of rotations per 60 seconds). The rotation conditions for the cylindrical metallic mold can be suitably set according to Formula (I).

The thickness of the obtained rubber-elastic layer was 248 µm.

A single rubber-elastic layer was formed in the same manner as above except that the filler was not added to the urethane solution for the elastic layer. Several of the rubber-elastic layers were superposed onto each other to a thickness of 10 mm, and the type A hardness was measured. The hardness was 40°.

(4) Lamination by Adhering the Polyimide Outer Surface to the Rubber-Elastic Layer Inner Surface Primer DY39-067 (produced by Dow Corning Toray Co., Ltd.) was applied to the inner surface of the rubber-elastic layer formed above in (3). After drying the surface by air, the polyimide belt obtained above in (1), to the outer surface of which an adhesive for dry lamination was thinly applied, was inserted in the rotary drum and superposed on the rubber-elastic layer. The polyimide belt and the rubber-elastic layer were adhered to each other by pressing them together from the inner side of the base layer, and heating (80 to 100° C.) was performed to complete the lamination. The laminated multilayered belt was removed from the mold, and both ends of the belt were cut so as to obtain a multilayered belt with a width of 360 mm.

The multilayered belt had a thickness of 333 µm, an outer circumferential length of 945.0 mm, a static friction coefficient of 0.33, a surface resistivity of $2\times10^{11}$ to $4\times10^{11}$ Ω/☐, a volume resistivity of $6\times10^{10}$ to $9\times10^{10}$ Ω·cm, and a surface roughness (Rz) of 0.7 µm.

Further, the cross section of the multilayered belt was observed by a scanning electron microscope (SEM) (FIG. 5(a) to (d)), and the mass concentration ratios of aluminum ($M_1/M_2$ and $M_1/M_3$) were determined by EDX. The results showed that $M_1/M_2=6.2$ and $M_1/M_3=14.1$. These results confirmed that the concentration of the filler in the region from the interface between the surface layer and the rubber-elastic layer toward the base layer to a depth of 20 µm was higher than that in the central portion of the rubber layer.

Example 2

A multilayered belt was produced in the same manner as in Example 1 except that the amount of aluminum borate incorporated in the rubber layer was 5 wt. % and the volume fraction thereof was 1.96%.

The obtained multilayered belt had a thickness of 334 µm, an outer circumferential length of 945.0 mm, a static friction coefficient of 0.29, a surface resistivity of $2\times10^{11}$ to $4\times10^{11}$ Ω/☐, a volume resistivity of $6\times10^{10}$ to $9\times10^{10}$ Ω·cm, and a surface roughness (Rz) of 0.7 µm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=12.5$ and $M_1/M_3=24.8$. These results confirmed that the concentration of the filler in the region from the interface between the surface layer and the rubber-elastic layer toward the base layer to a depth of 20 µm was higher than that in the central portion of the rubber layer.

Example 3

A multilayered belt was produced in the same manner as in Example 1 except that the aluminum borate incorporated in the rubber layer was in the form of particles (Alborite, produced by Shikoku Chemicals Corporation, average particle diameter D50=2.6 µm), the amount of aluminum borate was 5 wt. %, and the volume fraction thereof was 1.96%.

The obtained multilayered belt had a thickness of 337 µm, an outer circumferential length of 945.0 mm, a static friction coefficient of 0.29, a surface resistivity of $2\times10^{11}$ to $4\times10^{11}$ Ω/☐, a volume resistivity of $8\times10^{10}$ to $1\times10^{11}$ Ω·cm, and a surface roughness (Rz) of 0.7 µm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=11.5$ and $M_1/M_3=13.7$. These results confirmed that the concentration of the filler in the region from the interface between the surface layer and the rubber-elastic layer toward the base layer to a depth of 20 µm was higher than that in the central portion of the rubber layer.

Example 4

A multilayered belt was produced in the same manner as in Example 1 except that the filler incorporated in the rubber layer was mica (Somasif MTE, produced by CO-OP Chemical Co., Ltd., average particle diameter D50=6.0 µm), the amount of mica was 5.0 wt. %, and the volume fraction thereof was 2.17%.

The obtained multilayered belt had a thickness of 341 µm, an outer circumferential length of 945.0 mm, a static friction coefficient of 0.31, a surface resistivity of $5\times10^{10}$ to $7\times10^{10}$ Ω/☐, a volume resistivity of $3\times10^{10}$ to $5\times10^{10}$ Ω·cm, and a surface roughness (Rz) of 0.7 µm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=4.5$ and $M_1/M_3=6.0$. These results confirmed that the concentration of the filler in the region from the interface between the surface layer and the rubber-elastic layer toward the base layer to a depth of 20 µm was higher than that in the central portion of the rubber layer.

Example 5

A multilayered belt was produced in the same manner as in Example 4 except that the amount of mica incorporated in the rubber layer was 8.0 wt. %, and the volume fraction thereof was 3.38%.

The obtained multilayered belt had a thickness of 330 µm, an outer circumferential length of 945.0 mm, a static friction coefficient of 0.33, a surface resistivity of $3\times10^{10}$ to $6\times10^{10}$ Ω/☐, a volume resistivity of $1\times10^{10}$ to $2\times10^{10}$ Ω·cm, and a surface roughness (Rz) of 0.7 µm.

Further, the cross section of the multilayered belt was observed by a scanning electron microscope (SEM), and mass concentration ratios of aluminum ($M_1/M_2$ and $M_1/M_3$) were determined by EDX. The results showed that $M_1/M_2=3.6$ and $M_1/M_3=4.8$. These results confirmed that the concentration of the filler in the region from the interface between the surface layer and the rubber-elastic layer toward the base layer to a depth of 20 µm was higher than that in the central portion of the rubber layer.

Example 6

A multilayered belt was produced in the same manner as in Example 1 except that the filler incorporated in the rubber layer was zirconium oxide (TMZ Zirconium Oxide, produced by Daiichi Kigenso Kagaku Kogyo Co., Ltd., average particle diameter D50=1.3 µm), and the amount of zirconium oxide was 9.6 wt. %, and the volume fraction thereof was 1.96%.

The obtained multilayered belt had a thickness of 324 μm, an outer circumferential length of 945.0 mm, a static friction coefficient of 0.40, a surface resistivity of $6 \times 10^{11}$ to $8 \times 10^{11} \Omega/\square$, a volume resistivity of $9 \times 10^{10}$ to $2 \times 10^{11} \Omega \cdot cm$, and a surface roughness (Rz) of 0.7 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2 = 2.7$ and $M_1/M_3 = 3.2$. These results confirmed that the concentration of the filler in the region from the interface between the surface layer and the rubber-elastic layer toward the base layer to a depth of 20 μm was higher than that in the central portion of the rubber layer.

Example 7

A multilayered belt was produced in the same manner as in Example 1 except that the rubber-elastic layer was composed of the following two layers that have different hardness values.

Production of the First Rubber Layer

A solution of 22.6 g of a blocked urethane prepolymer (URE-HYPER RUP1627, produced by DIC Corporation) in 55.8 g of toluene was prepared. To the solution were added 0.35 g of CLH-5 (produced by DIC Corporation) and 1.05 g of 4,4-methylenebis(2-methylcyclohexanamine) (produced by DIC Corporation), both of which are aliphatic diamine curing agents, and the mixture was stirred. The obtained solution had a solids content of 30 wt. %. The solution was uniformly applied to the inner surface of the surface layer previously formed, while rotating the drum, and heating was initiated. The heating was performed by raising the temperature at a rate of 1° C./min to 150° C., and then heating at 150° C. for 30 minutes while rotating the drum to thereby form a first rubber-elastic layer to a thickness of 40 μm on the inner surface of the drum, after which the layer was cooled to room temperature.

A single rubber-elastic layer was produced using the urethane solution for the first rubber layer of the elastic layer in the same manner as above. Several of the rubber-elastic layers were superposed onto each other to a thickness of 10 mm, and the type A hardness was measured. The hardness was 71°.

Production of the Second Rubber Layer

A solution of 118.7 g of a blocked urethane prepolymer (URE-HYPER RUP1627, produced by DIC Corporation) in 153 g of toluene was prepared. To the solution was added 9.3 g of an aliphatic diamine curing agent CLH-5 (produced by DIC Corporation), and the mixture was stirred. The resulting solution was applied to the inner surface of the first rubber layer, and a second rubber layer with a thickness of 210 μm was formed in the same manner as the first rubber layer.

A single rubber-elastic layer was produced using the urethane solution for the second rubber layer of the elastic layer in the same manner as above. Several of the rubber-elastic layers were superposed onto each other to a thickness of 10 mm, and the type A hardness was measured. The hardness was 40°.

A multilayered belt was produced in the same manner as in Example 1.

The obtained multilayered belt had a thickness of 322 μm, an outer circumferential length of 945.0 mm, a static friction coefficient of 0.36, a surface resistivity of $3 \times 10^{11}$ to $5 \times 10^{11} \Omega/\square$, a volume resistivity of $6 \times 10^{10}$ to $9 \times 10^{10} \Omega \cdot cm$, and a surface roughness (Rz) of 0.6 μm.

Comparative Example 1

A multilayered belt was produced in the same manner as in Example 1 except that the filler was not incorporated in the rubber layer.

The obtained multilayered belt had a thickness of 328 μm, an outer circumferential length of 945.0 mm, a static friction coefficient of 0.48, a surface resistivity of $2 \times 10^{11}$ to $5 \times 10^{11} \Omega/\square$, a volume resistivity of $4 \times 10^{10}$ to $7 \times 10^{10} \Omega \cdot cm$, and a surface roughness (Rz) of 0.6 μm.

Comparative Example 2

A multilayered belt was produced in the same manner as in Comparative Example 1 except that 5.53 g of CLH-5 (produced by DIC Corporation) and 4.09 g of 4,4-methylenebis (2-methylcyclohexanamine) (produced by DIC Corporation) were used as curing agents.

A single rubber-elastic layer was produced using the urethane solution for the elastic layer in the same manner as above. Several of the rubber-elastic layers were superposed onto each other to a thickness of 10 mm, and the type A hardness was measured. The hardness was 55°.

The obtained multilayered belt had a thickness of 330 μm, an outer circumferential length of 945.0 mm, a static friction coefficient of 0.43, a surface resistivity of $3 \times 10^{11}$ to $6 \times 10^{11} \Omega/\square$, a volume resistivity of $4 \times 10^{10}$ to $8 \times 10^{10} \Omega \cdot cm$, and a surface roughness (Rz) of 0.6 μm.

Comparative Example 3

A multilayered belt was produced in the same manner as in Comparative Example 1 except that 2.21 g of CLH-5 (produced by DIC Corporation) and 6.55 g of 4,4-methylenebis (2-methylcyclohexanamine) (produced by DIC Corporation) were used as curing agents.

A single rubber-elastic layer was produced using the urethane solution for the elastic layer in the same manner as above. Several of the rubber-elastic layers were superposed onto each other to a thickness of 10 mm, and the type A hardness was measured. The hardness was 71°.

The obtained multilayered belt had a thickness of 328 μm, an outer circumferential length of 945.0 mm, a static friction coefficient of 0.37, a surface resistivity of $4 \times 10^{11}$ to $7 \times 10^{11} \Omega/\square$, a volume resistivity of $6 \times 10^{10}$ to $9 \times 10^{10} \Omega \cdot cm$, and a surface roughness (Rz) of 0.5 μm.

Comparative Example 4

A multilayered belt was produced in the same manner as in Example 1 except that the amount of aluminum borate was 0.6 wt. %, and the volume fraction thereof was 0.24%.

The obtained multilayered belt had a thickness of 329 μm, an outer circumferential length of 945.0 mm, a static friction coefficient of 0.40, a surface resistivity of $1 \times 10^{11}$ to $4 \times 10^{11} \Omega/\square$, a volume resistivity of $4 \times 10^{10}$ to $8 \times 10^{10} \Omega \cdot cm$, and a surface roughness (Rz) of 0.7 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2 = 5.7$ and $M_1/M_3 = 5.3$. These results confirmed that the concentration of the filler in the region from the interface between the surface layer and the rubber-elastic layer toward the base layer to a depth of 20 μm was higher than that in the central portion of the rubber layer.

Comparative Example 5

A multilayered belt was produced in the same manner as in Example 1 except that the amount of aluminum borate was 10.5 wt. %, and the volume fraction thereof was 4.03%.

The obtained multilayered belt had a thickness of 346 μm, an outer circumferential length of 945.0 mm, a static friction coefficient of 0.30, a surface resistivity of $5 \times 10^{11}$ to $9 \times 10^{11} \Omega/\text{⌾}$, a volume resistivity of $8 \times 10^{10}$ to $2 \times 10^{11} \Omega \cdot \text{cm}$, and a surface roughness (Rz) of 0.8 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=18.9$ and $M_1/M_3=46.6$. These results confirmed that the concentration of the filler in the region from the interface between the surface layer and the rubber-elastic layer toward the base layer to a depth of 20 μm was higher than that in the central portion of the rubber layer.

Comparative Example 6

A multilayered belt was produced in the same manner as in Example 1 except that the filler incorporated in the rubber layer was potassium titanate (Tismo D, produced by Otsuka Chemical Co., Ltd.), the amount of potassium titanate was 2.0 wt. %, and the volume fraction thereof was 0.71%.

The obtained multilayered belt had a thickness of 330 μm, an outer circumferential length of 945.0 mm, a static friction coefficient of 0.36, a surface resistivity of $1 \times 10^{11}$ to $2 \times 10^{11} \Omega/\text{⌾}$, a volume resistivity of $7 \times 10^{10}$ to $1 \times 10^{11} \Omega \cdot \text{cm}$, and a surface roughness (Rz) of 0.8 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=1.05$ and $M_1/M_3=1.05$. These results confirmed that the concentration of the filler in the region from the interface between the surface layer and the rubber-elastic layer toward the base layer to a depth of 20 μm was higher than that in the central portion of the rubber layer.

Comparative Example 7

A multilayered belt was produced in the same manner as in Comparative Example 6 except that the amount of potassium titanate incorporated in the rubber layer was 5.0 wt. %, and the volume fraction thereof was 1.73%.

The obtained multilayered belt had a thickness of 335 μm, an outer circumferential length of 945.0 mm, a static friction coefficient of 0.35, a surface resistivity of $2 \times 10^{11}$ to $5 \times 10^{11} \Omega/\text{⌾}$, a volume resistivity of $8 \times 10^{10}$ to $1 \times 10^{11} \Omega \cdot \text{cm}$, and a surface roughness (Rz) of 0.9 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=1.06$ and $M_1/M_3=1.12$. These results confirmed that the concentration of the filler in the region from the interface between the surface layer and the rubber-elastic layer toward the base layer to a depth of 20 μm was substantially the same as that in the central portion of the rubber layer.

Comparative Example 8

A multilayered belt was produced in the same manner as in Example 1 except that the filler incorporated in the rubber layer was fumed silica (Reolosil, produced by Tokuyama Corporation), and the amount of fumed silica was 10 wt. %, and the volume fraction thereof was 5.43%.

The obtained multilayered belt had a thickness of 359 μm, an outer circumferential length of 945.0 mm, a static friction coefficient of 0.39, a surface resistivity of $1 \times 10^{11}$ to $3 \times 10^{11} \Omega/\text{⌾}$, a volume resistivity of $6 \times 10^{10}$ to $9 \times 10^{10} \Omega \cdot \text{cm}$, and a surface roughness (Rz) of 0.6 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=1.01$ and $M_1/M_3=1.07$. These results confirmed that the concentration of the filler in the region from the interface between the surface layer and the rubber-elastic layer toward the base layer to a depth of 20 μm was substantially the same as that in the central portion of the rubber layer.

Test Example 1

The multilayered belts obtained in Examples 1 to 7 and Comparative Examples 1 to 8 were evaluated in terms of the following aspects. Table 2 shows the results.

Primary Transfer Efficiency (Missing Defect on Line Lmage)

The primary transfer efficiency (missing defect on line image) was obtained by measuring the weight of toner on a photo conductor before and after transferring an image that was composed only of lines, and then using the aforementioned formula to calculate the transfer efficiency. The missing defect on line Image was evaluated by the following criteria.

A: 90% or higher
B: 85 to 90%
C: Less than 85%

Secondary Transfer Efficiency (Image Transferability to Rough Paper)

Using Strathmore Writing Laid paper (produced by Strathmore having an unevenness of about 50 μm, solid printing with magenta (image density: magenta 100%) was performed, and the transfer of toner to the deepest portion (concave portion) was visually observed. The evaluation criteria are as follows.

A⁺: Completely transferred, with no unevenness
A: Slightly light in color
B: White streaks slightly observed
C: White streaks observed due to lack of toner transfer Paper Pass-Through Durability Test Under the following conditions, a paper pass-through test, an electric current application test, and a drive test were concurrently conducted. After performing the drive test in an amount corresponding to the pass-through of 100,000 sheets of paper, the presence of cracking on the surface layer and peeling were observed with a microscope, and the surface roughness of the belt and the quality of the image were confirmed. The cracking on the surface layer and peeling were evaluated based on the criteria shown below.

Drive speed: Outer peripheral belt speed of 300 mm/sec
Current application: A constant current of 50 μA was applied to a belt in the thickness direction from a power source (Trek 610C)
Paper pass-through: A sheet of copy paper was wound on the outer surface of the secondary transfer roll to simulate the condition of continuous paper feeding
Cleaning mechanism: Cleaning blade made of polyurethane rubber (rubber hardness: type A hardness of 80°)

Cracking on Surface Layer

Cracking was evaluated using a laser microscope, VK-9700, produced by Keyence Corporation.

The belt was observed before and after the paper pass-through durability test with a magnification of 1,000× using an objective lens (20×)×an ocular lens (50×). Using the images of the belt surface obtained in the observation, the line roughness was measured according to the measurement conditions (JIS B0601-2001) shown below.

Inclination correction: plane inclination correction (automatic)

Cutoff: None

Measurement length: 0.25 mm

The measurement was performed at five different points on the surface of the same belt, the average value of the maximum valley depth Rv was calculated, and the value obtained by subtracting Rv before the paper pass-through durability test from that after the paper pass-through durability test [Rv (after paper pass-through durability test)−Rv (before paper pass-through durability test)] was used as a criterion.

A: Less than 0.3 μm

B: 0.3 to 0.6 μm

C: Exceeding 0.6 μm

Surface-Layer Peeling

Peeling was evaluated by visually observing the belt after the paper pass-through durability test based on the following criteria.

A: No peeling observed on the entire surface of the belt

B: Peeling of 1×1 mm square or less observed

C: Peeling of 1×1 mm square or more observed

IRHD Value

According to JIS K6253, the rubber hardness was measured from the surface layer side of the belt using an IRHD micro hardness tester (model number: H12, produced by Wallace Instruments.

TABLE 2

|  |  | Paper Pass-Through Durability Test (Cracking on the surface layer) | Secondary Transfer Efficiency (Image Transferability to Rough Paper) | Halftone Image Evaluation | IRHD (IRHD) |
|---|---|---|---|---|---|
| Example | 1 | A | A | A | 77.8 |
|  | 2 | A | A | A | 80.3 |
|  | 3 | A | A | A | 78.0 |
|  | 4 | A | A | A | 78.7 |
|  | 5 | A | A | A | 78.9 |
|  | 6 | A | A | A | 77.5 |
|  | 7 | A | A | A | 76.3 |
| Comparative Example | 1 | C | A | A | 77.8 |
|  | 2 | B | B | A | 83.0 |
|  | 3 | A | C | A | 89.0 |
|  | 4 | A | A | C | 79.2 |
|  | 5 | C | A | C | 82.9 |
|  | 6 | A | A | B | 76.9 |
|  | 7 | A | A | B | 79.0 |
|  | 8 | C | A | A | 76.9 |
|  | 9 | B | A | A | 78.8 |

Example 8

(1) Formation of the Base Layer

Under a nitrogen flow, 47.6 g of 4,4'-diaminodiphenylether (ODA) was added to 488 g of N-methyl-2-pyrrolidone, and the mixture was maintained at 50° C. while stirring to achieve complete dissolution. To this solution was added 70 g of 3,3',4,4'-biphenyl tetracarboxylic dianhydride (BPDA) to yield 605.6 g of a polyamic acid solution. The obtained polyamic acid solution had a number average molecular weight of 19,000, a viscosity of 40 poise, and a solids content of 18.1 wt. %.

Subsequently, 21 g of acidic carbon black (pH 3.0) and 80 g of N-methyl-2-pyrrolidone were added to 450 g of the polyamic acid solution. Carbon black (CB) was uniformly dispersed using a ball mill. This master batch solution had a solids content of 18.6 wt. % and a CB concentration of 20.5 wt. % in the solids content.

Then, 273 g of the solution was collected, poured into a rotary drum, and molded under the following conditions.

TABLE 1

|  |  | Filler | | | | Type A rubber hardness (°) | Concentration ratio | |
|---|---|---|---|---|---|---|---|---|
|  |  | Kind | Volume fraction (%) | Average particle diameter D50 (μm) | Aspect ratio (Major axis/Minor axis) | Shape | | $M_1/M_2$ | $M_1/M_3$ |

| | | Kind | Volume fraction (%) | Average particle diameter D50 (μm) | Aspect ratio (Major axis/Minor axis) | Shape | hardness (°) | $M_1/M_2$ | $M_1/M_3$ |
|---|---|---|---|---|---|---|---|---|---|
| Example | 1 | Barium sulfate | 1.31 | 1.2 | 2.3 | Particle | 40 | 1.8 | 2.1 |
|  | 2 | Zirconium oxide | 1.63 | 0.6 | 2.1 | Particle | 40 | 2.5 | 2.8 |
|  | 3 | Zirconium oxide | 1.02 | 1.1 | 1.9 | Particle | 40 | 2.8 | 3.1 |
|  | 4 | Zirconium oxide | 0.62 | 1.1 | 1.9 | Particle | 40 | 3.4 | 3.9 |
|  | 5 | Aluminum borate | 1.17 | 2.6 | 1.7 | Particle | 40 | 1.4 | 1.5 |
|  | 6 | Spherical silica | 2.77 | 2.6 | 1.1 | Spherical | 40 | 4 | 4.5 |
|  | 7 | Spherical silica | 2.77 | 3.7 | 1.1 | Spherical | 40 | 2.9 | 4.7 |
| Comparative Example | 1 | None | — | — | — | — | 40 | — | — |
|  | 2 | None | — | — | — | — | 55 | — | — |
|  | 3 | None | — | — | — | — | 71 | — | — |
|  | 4 | Aluminum borate | 1.17 | 20 | 21.6 | Needle | 40 | 39.7 | 54.6 |
|  | 5 | Potassium titanate | 0.71 | 15 | 23.5 | Needle | 40 | 1.1 | 1.1 |
|  | 6 | Mica | 2.17 | 6 | 8.0 | Plate | 40 | 4.1 | 6.0 |
|  | 7 | Spherical silica | 2.77 | 8.5 | 1.1 | Spherical | 40 | 5.9 | 6.0 |
|  | 8 | Zirconium oxide | 1.02 | 0.25 | 1.9 | Particle | 40 | 1.1 | 1.1 |
|  | 9 | Barium sulfate | 1.02 | 0.3 | 2.1 | Particle | 40 | 1.1 | 1.2 |

Rotary drum: A metal drum with a mirror-finish inner surface having an inner diameter of 301.5 mm and a width of 540 mm was placed on two rotary rollers, and arranged so that the drum would rotate with the rotation of the rollers (see FIG. 2).

Heating temperature: A far-infrared radiation heater was arranged around the outer surface of the drum to control the inner surface temperature of the drum to 120° C.

First, while rotating the rotary drum, 273 g of the solution was uniformly applied to the inner surface of the drum, and heating was initiated. The heating was performed by raising the temperature at a rate of 1° C./min to 120° C., and then heating at 120° C. for 60 minutes while rotating the drum.

After the rotation and heating, the rotary drum was detached as is, without cooling, and allowed to stand in a hot air convection oven to initiate heating for imidization. The heating was performed by gradually raising the temperature to 320° C., and then heating at 320° C. for 30 minutes. After the heating, the drum was cooled to room temperature, and a semiconductive tubular polyimide belt formed on the inner surface of the drum was peeled off. The belt had a thickness of 79 μm, an outer circumferential length of 944.3 mm, a surface resistivity of $2\times10^{11}$ to $4\times10^{11}$ Ω/◉, and a volume resistivity of $1\times10^{9}$ to $3\times10^{9}$ Ω·cm.

(2) Formation of the Surface Layer 100 g of a VdF-HFP copolymer resin (Kynar #2821, produced by Arkema Inc.: HFP 11 mol %), i.e., a copolymer of vinylidene fluoride (VdF) and hexafluoropropylene (HFP), was dissolved in 900 g of N,N-dimethylacetamide (DMAc) to prepare a Solution A with a solids content of 10 wt. %.

100 g of an organic-modified montmorillonite (Lucentite STN, produced by CO-OP Chemical Co., Ltd.) was added to 900 g of dimethylacetamide. The mixture was uniformly dispersed using a ball mill to prepare a Solution B with a solids content of 10 wt. %.

Solutions A and B were blended at a ratio of A:B=99:1, and mixed using a paint shaker to prepare a solution with a solids content of 10 wt. % and with an organic modified montmorillonite concentration of 1 wt. % within the solids content. This solution was diluted with a mixed solvent of DMAc and butyl acetate (DMAc:butyl acetate=1:2) to prepare a solution (hereinafter sometimes referred to as the "surface layer material") with a solids content of 1.6 wt. % and with an organic modified montmorillonite concentration of 1 wt. % within the solids content (corresponding to the proportion of montmorillonite to the total weight of the surface layer). A layer was formed using 112 g of this solution under the following conditions.

Rotary drum: A metal drum with an inner diameter of 301.0 mm, a width of 540 mm, and an inner surface ten-point mean roughness (Rz) of 0.5 μm was placed on two rotary rollers, and arranged so that the drum would rotate with rotation of the rollers (see, for example, FIG. 2).

While rotating the rotary drum, the solution was uniformly applied to the inner surface of the drum, and heating was initiated. The heating was performed by raising the temperature at a rate of 2° C./min to 130° C., and then heating at 130° C. for 20 minutes while rotating the drum. After a surface layer was formed on the inner surface of the drum, the drum was cooled to room temperature. The thickness of the surface layer formed on the inner surface of the drum was measured using an eddy-current coating thickness tester (produced by Kett Electric Laboratory). The thickness of the surface layer was 2 μm.

Using the above surface layer material, another surface layer with a thickness of 10 μm was produced under the same formation conditions. The 10 μm-thick surface layer had a volume resistance of $4\times10^{12}$ Ω·cm, a Young's modulus of 610 MPa, and a surface roughness (Rz) of 0.6 μm.

(3) Formation of the Elastic Layer

A solution of 141.3 g of a blocked urethane prepolymer (URE-HYPER RUP 1627, produced by DIC Corporation) in 188 g of toluene was prepared. As a filler, 7.93 g of amorphous barium sulfate particles with an average aspect ratio of 2.3 (BALIACE B-54, produced by Sakai Chemical Industry Co., Ltd., average particle diameter D50=1.2 μm) was added thereto, and uniformly dispersed using a ball mill. Further, 11.07 g of an aliphatic diamine curing agent (CLH-5, produced by DIC Corporation) was added to the dispersion and stirred.

The dispersion thus obtained had a solids content of 46 wt. %, and a barium sulfate content of 5.0 wt. % within the solids content, and a volume fraction of barium sulfate of 1.31% within the solids content. While rotating the drum, this dispersion was uniformly applied to the inner surface of the surface layer previously formed, and heating was initiated. The heating was performed by raising the temperature at a rate of 1° C./min to 150° C., and then heating at 150° C. for 30 minutes while rotating the drum to form a rubber-elastic layer inside the drum.

In this heating step, the rotary drum was rotated at a centrifugal acceleration that was 7.4 times the gravitational acceleration.

Gravitational acceleration (g) is generally 9.8 (m/s$^2$).

Centrifugal acceleration (G) is given by the following Formula (I):

$$G(m/s^2)=r\cdot\omega^2=r\cdot(2\pi\cdot n)^2 \quad (I)$$

wherein r is the radius (m) of a cylindrical mold, ω is angular velocity (rad/s), and n is the number of rotations per second (rpm for the number of rotations per 60 seconds). The rotation conditions for the cylindrical metallic mold can be suitably set according to Formula (I).

The thickness of the obtained rubber-elastic layer was 258 μm.

A single rubber-elastic layer was produced in the same manner as above except that the filler was not added to the urethane solution for the elastic layer. Several of the rubber-elastic were superposed onto each other to a thickness of 10 mm, and the type A hardness was measured. The hardness was 40°.

(4) Lamination by Adhering the Polyimide Outer Surface to the Rubber-Elastic Layer Inner Surface Primer DY39-067 (produced by Dow Corning Toray Co., Ltd.) was applied to the inner surface of the rubber-elastic layer formed above in (3). After drying the surface by air, the polyimide belt obtained above in (1), to the outer surface of which an adhesive for dry lamination was thinly applied, was inserted in the rotary drum and superposed onto the rubber-elastic layer. The polyimide belt and the rubber-elastic layer were adhered to each other by pressing them together from the inner side of the base layer, and heating (80 to 100° C.) was performed to complete the lamination. The laminated multilayered belt was removed from the mold, and both ends of the belt were cut so as to obtain a multilayered belt with a width of 360 mm.

The multilayered belt had a thickness of 333 μm, an outer circumferential length of 945.0 mm, a static friction coefficient of 0.39, a surface resistivity of $1\times10^{11}$ to $3\times10^{11}$ Ω/◉, a volume resistivity of $4\times10^{10}$ to $6\times10^{10}$ Ω·cm, and a surface roughness (Rz) of 0.5 μm.

Further, the cross section of the multilayered belt was observed by a scanning electron microscope (SEM), and the mass concentration ratios of barium ($M_1/M_2$ and $M_1/M_3$)

were determined by EDX. The results showed that $M_1/M_2=1.8$ and $M_1/M_3=2.1$. These results confirmed that the concentration of the filler in the region from the interface between the surface layer and the rubber-elastic layer toward the base layer to a depth of 20 μm was higher than that in the central portion of the rubber layer.

Example 9

A multilayered belt was produced in the same manner as in Example 8 except that the filler incorporated in the rubber layer was amorphous zirconium oxide particles with an average aspect ratio of 2.1 (UEP Zirconium Oxide, average particle diameter D50=0.6 μm, produced by Daiichi Kigenso Kagaku Kogyo Co., Ltd.), and the amount of the filler was 8 wt. %, and the volume fraction thereof was 1.63%.

The obtained multilayered belt had a thickness of 340 μm, an outer circumferential length of 945.0 mm, a static friction coefficient of 0.36, a surface resistivity of $3\times10^{11}$ to $5\times10^{11}\Omega/$☐, a volume resistivity of $8\times10^{10}$ to $1\times10^{11}\Omega\cdot cm$, and a surface roughness (Rz) of 0.8 μm.

Further, the cross section of the multilayered belt was observed by a scanning electron microscope (SEM), and the mass concentration ratios of zirconium ($M_1/M_2$ and $M_1/M_3$) were determined by EDX. The results showed that $M_1/M_2=2.5$ and $M_1/M_3=2.8$. These results confirmed that the concentration of the filler in the region from the interface between the surface layer and the rubber-elastic layer toward the base layer to a depth of 20 μm was higher than that in the central portion of the rubber layer.

Example 10

A multilayered belt was produced in the same manner as in Example 9 except that zirconium oxide incorporated in the rubber layer was amorphous zirconium oxide particles with an average aspect ratio of 1.9 (EP zirconium oxide, produced by Daiichi Kigenso Kagaku Kogyo Co., Ltd., average particle diameter D50=1.1 μm), the amount of zirconium oxide was 5 wt. %, and the volume fraction thereof was 1.02%.

The obtained multilayered belt had a thickness of 339 μm, an outer circumferential length of 945.0 mm, a static friction coefficient of 0.38, a surface resistivity of $1\times10^{11}$ to $4\times10^{11}\Omega/$☐, a volume resistivity of $5\times10^{10}$ to $8\times10^{10}\Omega\cdot cm$, and a surface roughness (Rz) of 0.7 μm.

Further, the cross section of the multilayered belt was observed by a scanning electron microscope (SEM), and the mass concentration ratios of zirconium ($M_1/M_2$ and $M_1/M_3$) were determined by EDX. The results showed that $M_1/M_2=2.8$ and $M_1/M_3=3.1$. These results confirmed that the concentration of the filler in the region from the interface between the surface layer and the rubber-elastic layer toward the base layer to a depth of 20 μm was higher than that in the central portion of the rubber layer.

Example 11

A multilayered belt was produced in the same manner as in Example 10 except that the amount of zirconium oxide incorporated in the rubber layer was 3 wt. %, and the volume fraction thereof was 0.62%.

The obtained multilayered belt had a thickness of 337 μm, an outer circumferential length of 945.0 mm, a static friction coefficient of 0.40, a surface resistivity of $1\times10^{11}$ to $2\times10^{11}\Omega/$☐, a volume resistivity of $4\times10^{10}$ to $6\times10^{10}\Omega\cdot cm$, and a surface roughness (Rz) of 0.7 μm.

Further, the cross section of the multilayered belt was observed by a scanning electron microscope (SEM), and the mass concentration ratios of zirconium ($M_1/M_2$ and $M_1/M_3$) were determined by EDX. The results showed that $M_1/M_2=3.4$ and $M_1/M_3=3.9$. These results confirmed that the concentration of the filler in the region from the interface between the surface layer and the rubber-elastic layer toward the base layer to a depth of 20 μm was higher than that in the central portion of the rubber layer.

Example 12

A multilayered belt was produced in the same manner as in Example 8 except that the filler incorporated in the rubber layer was amorphous aluminum borate particles (Alborite PF-03, produced by Shikoku Chemicals Corporation, average particle diameter D50=2.6 μm), the amount of aluminum borate was 3 wt. %, and the volume fraction thereof was 1.17%.

The obtained multilayered belt had a thickness of 338 μm, an outer circumferential length of 945.0 mm, a static friction coefficient of 0.33, a surface resistivity of $3\times10^{11}$ to $6\times10^{11}\Omega/$☐, a volume resistivity of $5\times10^{10}$ to $9\times10^{10}\Omega\cdot cm$, and a surface roughness (Rz) of 0.7 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=1.4$ and $M_1/M_3=1.5$. These results confirmed that the concentration of the filler in the region from the interface between the surface layer and the rubber-elastic layer toward the base layer to a depth of 20 μm was higher than that in the central portion of the rubber layer.

Example 13

A multilayered belt was produced in the same manner as in Example 8 except that the filler incorporated in the rubber layer was spherical silica with an average aspect ratio of 1.1 (SP30, produced by Micron Co., Ltd., average particle diameter D50=2.6 μm), the amount of silica was 5 wt. %, and the volume fraction thereof was 2.77%.

The obtained multilayered belt had a thickness of 342 μm, an outer circumferential length of 945.0 mm, a static friction coefficient of 0.25, a surface resistivity of $1\times10^{11}$ to $3\times10^{11}\Omega/$☐, a volume resistivity of $2\times10^{10}$ to $5\times10^{10}\Omega\cdot cm$, and a surface roughness (Rz) of 0.7 μm.

Further, the cross section of the multilayered belt was observed by a scanning electron microscope (SEM), and the mass concentration ratios of silica ($M_1/M_2$ and $M_1/M_3$) were determined by EDX. The results showed that $M_1/M_6=4$ and $M_1/M_3=4.5$. These results confirmed that the concentration of the filler in the region from the interface between the surface layer and the rubber-elastic layer toward the base layer to a depth of 20 μm was higher than that in the central portion of the rubber layer.

Example 14

A multilayered belt was produced in the same manner as in Example 8 except that the filler incorporated in the rubber layer was spherical silica with an average aspect ratio of 1.1 (S-0, produced by Micron Co., Ltd., average particle diameter D50=3.7 μm), the amount of silica was 5 wt. %, and the volume fraction thereof was 2.77%.

The obtained multilayered belt had a thickness of 342 μm, an outer circumferential length of 945.0 mm, a static friction coefficient of 0.27, a surface resistivity of $1 \times 10^{11}$ to $3 \times 10^{11} \Omega/$⊛, a volume resistivity of $2 \times 10^{10}$ to $5 \times 10^{10} \Omega \cdot cm$, and a surface roughness (Rz) of 0.9 μm.

Further, the cross section of the multilayered belt was observed by a scanning electron microscope (SEM), and the mass concentration ratios of silicon ($M_1/M_2$ and $M_1/M_6$) were determined by EDX. The results showed that $M_1/M_2=2.9$ and $M_1/M_3=4.7$. These results confirmed that the concentration of the filler in the region from the interface between the surface layer and the rubber-elastic layer toward the base layer to a depth of 20 μm was higher than that in the central portion of the rubber layer.

Example 15

A multilayered belt was produced in the same manner as in Example 8 except that the filler incorporated was needle-shaped aluminum borate with an average aspect ratio of 21.6 (Alborex, produced by Shikoku Chemicals Corporation, average particle diameter D50=20 μm) in an amount of 3 wt. %, and the volume fraction thereof was 1.17%.

The obtained multilayered belt had a thickness of 331 μm, an outer circumferential length of 945.0 mm, a static friction coefficient of 0.31, a surface resistivity of $1 \times 10^{11}$ to $3 \times 10^{11} \Omega/$⊛, a volume resistivity of $5 \times 10^{10}$ to $8 \times 10^{10} \Omega \cdot cm$, and a surface roughness (Rz) of 0.7 μm.

Further, the cross section of the multilayered belt was observed by a scanning electron microscope (SEM), and the mass concentration ratios of aluminum ($M_1/M_2$ and $M_1/M_3$) were determined by EDX. The results showed that $M_1/M_2=39.7$ and $M_1/M_3=54.6$. These results confirmed that the concentration of the filler in the region from the interface between the surface layer and the rubber-elastic layer toward the base layer to a depth of 20 μm was higher than that in the central portion of the rubber layer.

Example 16

A multilayered belt was produced in the same manner as in Example 8 except that the filler incorporated was plate-shaped mica with an average aspect ratio of 8.0 (Somasif MTE, produced by CO-OP Chemical Co., Ltd., average particle diameter D50=6.0 μm) in an amount of 5 wt. %, and the volume fraction thereof was 2.17%.

The obtained multilayered belt had a thickness of 341 μm, an outer circumferential length of 945.0 mm, a static friction coefficient of 0.31, a surface resistivity of $5 \times 10^{10}$ to $7 \times 10^{10} \Omega/$⊛, a volume resistivity of $3 \times 10^{10}$ to $5 \times 10^{10} \Omega \cdot cm$, and a surface roughness (Rz) of 0.7 μm.

Further, the cross section of the multilayered belt was observed by a scanning electron microscope (SEM), and the mass concentration ratios of silicon ($M_1/M_2$ and $M_1/M_3$) were determined by EDX. The results showed that $M_1/M_2=4.1$ and $M_1/M_3=6.0$. These results confirmed that the concentration of the filler in the region from the interface between the surface layer and the rubber-elastic layer toward the base layer to a depth of 20 μm was higher than that in the central portion of the rubber layer.

Example 17

A multilayered belt was produced in the same manner as in Example 8 except that the filler incorporated in the rubber layer was spherical silica with an average aspect ratio of 1.1 (S-COX88, produced by Micron Co., Ltd., average particle diameter D50=8.5 μm), the amount of silica was 5 wt. %, and the volume fraction thereof was 2.77%.

The obtained multilayered belt had a thickness of 344 μm, an outer circumferential length of 945.0 mm, a static friction coefficient of 0.31, a surface resistivity of $2 \times 10^{11}$ to $3 \times 10^{11} \Omega/$⊛, a volume resistivity of $3 \times 10^{10}$ to $8 \times 10^{10} \Omega \cdot cm$, and a surface roughness (Rz) of 1.6 μm.

Further, the cross section of the multilayered belt was observed by a scanning electron microscope (SEM), and the mass concentration ratios of silicon ($M_1/M_2$ and $M_1/M_3$) were determined by EDX. The results showed that $M_1/M_2=5.9$ and $M_1/M_3=6.0$. These results confirmed that the concentration of the filler in the region from the interface between the surface layer and the rubber-elastic layer toward the base layer to a depth of 20 μm was higher than that in the central portion of the rubber layer.

Test Example 2

The multilayered belts obtained in Examples 8 to 17 were evaluated for the following items. Table 3 shows the results.

The paper pass-through durability test (cracking on the surface layer), secondary transfer efficiency test (image transferability to rough paper), and IRHD rubber hardness test were performed in the same manner as in Test Example 1.

Halftone Image Evaluation

A full halftone image (image density: magenta 30%) was printed out, the image was enlarged by 50×, and the presence of generated noise was checked over the entire image.

A+: No noise observed at all
A: Slight noise observed
B: Noise observed
C: Considerable noise observed

TABLE 3

| | | Filler | | | | Type A | Concentration ratio | |
|---|---|---|---|---|---|---|---|---|
| | Kind | Volume fraction (%) | Average particle diameter D50 (μm) | Aspect ratio (Major axis/Minor axis) | Shape | rubber hardness (°) | $M_1/M_2$ | $M_1/M_3$ |
| Example 8 | Barium sulfate | 1.31 | 1.2 | 2.3 | Particle | 40 | 1.8 | 2.1 |
| 9 | Zirconium oxide | 1.63 | 0.6 | 2.1 | Particle | 40 | 2.5 | 2.8 |
| 10 | Zirconium oxide | 1.02 | 1.1 | 1.9 | Particle | 40 | 2.8 | 3.1 |
| 11 | Zirconium oxide | 0.62 | 1.1 | 1.9 | Particle | 40 | 3.4 | 3.9 |
| 12 | Aluminum borate | 1.17 | 2.6 | 1.7 | Particle | 40 | 1.4 | 1.5 |
| 13 | Spherical silica | 2.77 | 2.6 | 1.1 | Spherical | 40 | 4 | 4.5 |
| 14 | Spherical silica | 2.77 | 3.7 | 1.1 | Spherical | 40 | 2.9 | 4.7 |
| 15 | Aluminum borate | 1.77 | 20 | 21.6 | Needle | 40 | 39.7 | 54.6 |
| 16 | Mica | 2.17 | 6 | 8.0 | Plate | 40 | 4.1 | 6.0 |
| 17 | Spherical silica | 2.77 | 8.5 | 1.1 | Spherical | 40 | 5.9 | 6.0 |

TABLE 4

| | | Paper Pass-Through Durability Test (Cracking on the surface layer) | Secondary Transfer Efficiency (Image Transferability to Rough Paper) | Halftone Image Evaluation | IRHD (IRHD) |
|---|---|---|---|---|---|
| Example | 8 | A | A | A⁺ | 77.8 |
| | 9 | A | A | A⁺ | 80.3 |
| | 10 | A | A | A⁺ | 78.0 |
| | 11 | A | A | A⁺ | 78.7 |
| | 12 | A | A | A⁺ | 78.9 |
| | 13 | A | A | A⁺ | 77.5 |
| | 14 | A | A | A⁺ | 76.3 |
| | 15 | A | A | B | 79.2 |
| | 16 | A | A | A | 76.9 |
| | 17 | A | A | A | 79.0 |

The invention claimed is:

1. An intermediate transfer belt for an image-forming device, comprising at least the three following layers laminated in the described order:
   (a) a base layer formed from resin,
   (b) a rubber-elastic layer formed from a rubber or elastomer, having a thickness of 200 to 400 µm, and
   (c) a surface layer formed from resin, having a thickness of 0.5 to 6 µm,
wherein the intermediate transfer belt has the following properties:
   (i) the dynamic ultramicro hardness (ISO14577-1) measured from the surface layer side is 2.5 to 4.5 N/mm² at an indentation depth of 2 µm, and 1.0 N/mm² or less at an indentation depth of 10 µm, and/or
   (ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 µm, to the mass concentration $M_3$ of the filler in the region from 120 µm to 140 µm in depth from the interface between the surface layer and the rubber-elastic layer toward the base layer is 1.3 or higher.

2. The intermediate transfer belt for an image-forming device to claim 1, wherein (i) the dynamic ultramicro hardness (ISO14577-1) measured from the surface layer side is 2.5 to 4.5 N/mm² at an indentation depth of 2 µm, and 1.0 N/mm² or less at an indentation depth of 10 µm.

3. The intermediate transfer belt for an image-forming device according to claim 1, wherein (ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 µm, to the mass concentration $M_3$ of the filler in the region from 120 µm to 140 µm in depth from the interface between the surface layer and the rubber-elastic layer toward the base layer is 1.3 or higher.

4. The intermediate transfer belt for an image-forming device according to claim 1, wherein the rubber-elastic layer comprises two or more layers having different degrees of hardness, and the type A hardness of the rubber layer on the surface layer side is higher than the type A hardness of the rubber layer on the base layer side.

5. The intermediate transfer belt for an image-forming device according to claim 1, wherein the Young's modulus of the surface layer is 300 to 2,000 MPa.

6. The intermediate transfer belt for an image-forming device according to claim 1, wherein the IRHD value (JIS K6253) measured from the surface layer side is 82 or less.

7. A method for producing an intermediate transfer belt for an image-forming device, according to claim 1, comprising the steps of
   (1) subjecting resin to centrifugal molding or melt extruding to form a base layer;
   (2) dissolving or swelling resin in an organic solvent to prepare a solution, and subjecting the solution to centrifugal molding using a cylindrical mold to form a surface layer having a thickness of 0.5 to 6 µm;
   (3) forming a rubber-elastic layer having a thickness of 200 to 400 µm on the inner surface of the surface layer obtained in (2) by subjecting a material for the rubber-elastic layer containing a filler (a composition for forming an elastic layer) to centrifugal molding on the inner surface to form a two-layered film; and
   (4) placing the outer surface of the base layer obtained in (1) onto the inner surface of the rubber-elastic layer of the two-layered film obtained in (3), and performing a heat treatment.

8. The intermediate transfer belt for an image-forming device according to claim 2, wherein further (ii) the rubber-elastic layer contains a filler in a proportion of 0.4 to 4.0 vol. %, and the ratio ($M_1/M_3$) of the mass concentration $M_1$ of the filler in the region from the interface between the surface layer and the rubber-elastic layer toward the base layer to a depth of 20 µm, to the mass concentration $M_3$ of the filler in the region from 120 µm to 140 µm in depth from the interface between the surface layer and the rubber-elastic layer toward the base layer is 1.3 or higher.

* * * * *